(12) United States Patent
Zheng et al.

(10) Patent No.: US 12,519,533 B2
(45) Date of Patent: Jan. 6, 2026

(54) BEAM FAILURE DETECTION IN FULL-DUPLEX OPERATION

(71) Applicant: QUALCOMM Incorporated, San Diego, CA (US)

(72) Inventors: Ruiming Zheng, Beijing (CN); Muhammad Sayed Khairy Abdelghaffar, San Jose, CA (US); Linhai He, San Diego, CA (US); Huilin Xu, Temecula, CA (US); Abdelrahman Mohamed Ahmed Mohamed Ibrahim, San Diego, CA (US); Ahmed Attia Abotabl, San Diego, CA (US); Krishna Kiran Mukkavilli, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 18/546,928

(22) PCT Filed: Apr. 20, 2021

(86) PCT No.: PCT/CN2021/088296
§ 371 (c)(1),
(2) Date: Aug. 17, 2023

(87) PCT Pub. No.: WO2022/222021
PCT Pub. Date: Oct. 27, 2022

(65) Prior Publication Data
US 2024/0137096 A1 Apr. 25, 2024
US 2024/0235649 A9 Jul. 11, 2024

(51) Int. Cl.
*H04B 7/06* (2006.01)
*H04B 17/336* (2015.01)
(Continued)

(52) U.S. Cl.
CPC ..... *H04B 7/06964* (2023.05); *H04B 7/06952* (2023.05); *H04B 17/336* (2015.01);
(Continued)

(58) Field of Classification Search
CPC ............ H04B 7/06964; H04B 7/06952; H04B 17/336; H04B 7/088; H04L 5/0051;
(Continued)

(56) References Cited

U.S. PATENT DOCUMENTS 10,439,791 B2 * 10/2019 Kalhan ................ H04L 5/0053
2018/0212746 A1 * 7/2018 Kazmi .................... H04L 5/14
(Continued)

FOREIGN PATENT DOCUMENTS

WO WO-2020140026 7/2020

OTHER PUBLICATIONS

International Search Report and Written Opinion—PCT/CN2021/088296—ISA/EPO—Oct. 19, 2021.
(Continued)

*Primary Examiner* — Harry H Kim
(74) *Attorney, Agent, or Firm* — Guang Y. Zhang; Harrity & Harrity, LLP

(57) ABSTRACT

Various aspects of the present disclosure generally relate to wireless communication. In some aspects, a user equipment (UE) may receive, from a base station, a beam failure detection (BFD) reference signal set in one or more slots in a full-duplex mode and in one or more slots in a half-duplex mode. The UE may detect beam failure due to self-interference based at least in part on a comparison of measurements of the BFD reference signal set in the full-duplex mode and half-duplex mode. The UE may switch from the full-duplex mode to the half-duplex mode for slots configured for the (Continued)

full-duplex mode based at least in part on detecting beam failure due to self-interference. Numerous other aspects are described.

30 Claims, 14 Drawing Sheets

(51) Int. Cl.
  *H04L 5/00* (2006.01)
  *H04L 5/14* (2006.01)
  *H04L 5/16* (2006.01)
  *H04W 24/08* (2009.01)
  *H04W 72/0446* (2023.01)
  *H04W 72/0453* (2023.01)
  *H04W 76/19* (2018.01)
  *H04W 88/06* (2009.01)

(52) U.S. Cl.
  CPC .............. *H04L 5/0051* (2013.01); *H04L 5/14* (2013.01); *H04W 76/19* (2018.02)

(58) Field of Classification Search
  CPC ... H04L 5/14; H04L 5/003; H04L 5/16; H04L 5/0048; H04W 76/19; H04W 24/08; H04W 72/0446; H04W 72/0453; H04W 88/06
  See application file for complete search history.

(56) References Cited

U.S. PATENT DOCUMENTS

2022/0182160 A1\* 6/2022 Su .................... H04B 17/309
2022/0216976 A1\* 7/2022 Zhang .................. H04L 5/0073

OTHER PUBLICATIONS

LG Electronics: "Motivation for New SI: Study on Duplexing Flexibility for NR," 3GPP Draft, 3GPP TSG RAN Meeting #90-e, RP-202546, 3rd Generation Partnership Project (3GPP), Mobile Competence Centre, 650, Route Des Lucioles, F-06921, Sophia-Antipolis Cedex, France, vol. TSG RAN, No. Electronic Meeting; Dec. 7, 2020-Dec. 11, 2020, Nov. 30, 2020 (Nov. 30, 2020), XP051963104, 8 pages, p. 3-p. 5.

LG Electronics: "Motivation for New SI: Study on Duplexing Flexibility for NR," 3GPP Draft, 3GPP TSG RAN Meeting #91-e, RP-210453, 3rd Generation Partnership Project (3GPP), Mobile Competence Centre, 650, Route Des Lucioles, F-06921, Sophia-Antipolis Cedex, France, vol. TSG RAN, No. Electronic Meeting, Mar. 16, 2021-Mar. 26, 2021, Mar. 15, 2021 (Mar. 15, 2021), XP051985797, 8 pages, p. 2-p. 4 Annex 1: System Parameters.

Qualcomm Incorporated: "Resource Management for Enhanced Duplexing," 3GPP Draft, 3GPP TSG RAN WG1 Meeting #103-e, R1-2009269, 3rd Generation Partnership Project (3GPP), Mobile Competence Centre, 650, Route Des Lucioles, F-06921, Sophia-Antipolis Cedex, France, vol. RAN WG1, No. e-meeting, Oct. 26, 2020-Nov. 13, 2020, Oct. 24, 2020 (Oct. 24, 2020), XP051946932, 10 Pages.

\* cited by examiner

BEAM FAILURE DETECTION IN FULL-DUPLEX OPERATION

CROSS-REFERENCE TO RELATED APPLICATION

This Patent Application is a 371 national stage of PCT Application No. PCT/CN2021/088296 filed on Apr. 20, 2021, entitled "BEAM FAILURE DETECTION IN FULL-DUPLEX OPERATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam failure detection in full-duplex operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive, from a base station, a beam failure detection (BFD) reference signal set in one or more slots in a full-duplex mode and in one or more slots in a half-duplex mode; detect beam failure due to self-interference based at least in part on a comparison of measurements of the BFD reference signal set in the full-duplex mode and half-duplex mode; and switch from the full-duplex mode to the half-duplex mode for slots configured for the full-duplex mode based at least in part on detecting beam failure due to self-interference.

In some aspects, a UE for wireless communication includes a memory and one or more processors, coupled to the memory, configured to: receive, from a base station, a first BFD reference signal set in one or more slots in a full-duplex mode, and a second BFD reference signal set in one or more slots in a half-duplex mode; detect beam failure in the full-duplex mode based at least in part on the first BFD reference signal set; detect a cause of the beam failure in the full-duplex mode based at least in part on measurements of the first BFD reference signal set in the full-duplex mode and measurements of the second BFD reference signal set in the half-duplex mode; and transmit, to the base station in a beam failure recovery (BFR) medium access control (MAC) control element (MAC-CE), an indication of the cause of the beam failure.

In some aspects, a method of wireless communication performed by a UE includes receiving, from a base station, a BFD reference signal set in one or more slots in a full-duplex mode and in one or more slots in a half-duplex mode; detecting beam failure due to self-interference based at least in part on a comparison of measurements of the BFD reference signal set in the full-duplex mode and half-duplex mode; and switching from the full-duplex mode to the half-duplex mode for slots configured for the full-duplex mode based at least in part on detecting beam failure due to self-interference.

In some aspects, a method of wireless communication performed by a UE includes receiving, from a base station, a first BFD reference signal set in one or more slots in a full-duplex mode, and a second BFD reference signal set in one or more slots in a half-duplex mode; detecting beam failure in the full-duplex mode based at least in part on the first BFD reference signal set; detecting a cause of the beam failure in the full-duplex mode based at least in part on measurements of the first BFD reference signal set in the full-duplex mode and measurements of the second BFD reference signal set in the half-duplex mode; and transmitting, to the base station in a BFR MAC-CE, an indication of the cause of the beam failure.

In some aspects, a non-transitory computer-readable medium storing a set of instructions for wireless communication includes one or more instructions that, when executed by one or more processors of a UE, cause the UE to: receive, from a base station, a BFD reference signal set in one or more slots in a full-duplex mode and in one or more slots in a half-duplex mode; detect beam failure due to self-interference based at least in part on a comparison of measurements of the BFD reference signal set in the full-duplex mode and half-duplex mode; and switch from the full-duplex mode to the half-duplex mode for slots configured for the full-duplex mode based at least in part on detecting beam failure due to self-interference.

In some aspects, a non-transitory computer-readable medium storing a set of instructions for wireless communication includes one or more instructions that, when executed by one or more processors of an UE, cause the UE to: receive, from a base station, a first BFD reference signal set in one or more slots in a full-duplex mode, and a second BFD reference signal set in one or more slots in a half-duplex mode; detect beam failure in the full-duplex mode based at least in part on the first BFD reference signal set; detect a cause of the beam failure in the full-duplex mode based at least in part on measurements of the first BFD reference signal set in the full-duplex mode and measurements of the second BFD reference signal set in the half-duplex mode; and transmit, to the base station in a BFR MAC-CE, an indication of the cause of the beam failure.

In some aspects, an apparatus for wireless communication includes means for receiving, from a base station, a BFD reference signal set in one or more slots in a full-duplex mode and in one or more slots in a half-duplex mode; means for detecting beam failure due to self-interference based at least in part on a comparison of measurements of the BFD reference signal set in the full-duplex mode and half-duplex mode; and means for switching from the full-duplex mode to the half-duplex mode for slots configured for the full-duplex mode based at least in part on detecting beam failure due to self-interference.

In some aspects, an apparatus for wireless communication includes means for receiving, from a base station, a first BFD reference signal set in one or more slots in a full-duplex mode, and a second BFD reference signal set in one or more slots in a half-duplex mode; means for detecting beam failure in the full-duplex mode based at least in part on the first BFD reference signal set; means for detecting a cause of the beam failure in the full-duplex mode based at least in part on measurements of the first BFD reference signal set in the full-duplex mode and measurements of the second BFD reference signal set in the half-duplex mode; and means for transmitting, to the base station in a BFR MAC-CE, an indication of the cause of the beam failure.

In some aspects, a base station for wireless communication includes a memory; and one or more processors, coupled to the memory, configured to: transmit, to a UE, a first BFD resource configuration for a full-duplex mode of the UE and a second BFD resource configuration for a half-duplex mode of the UE, wherein the first BFD resource configuration includes a first BFD reference signal resources for a first BFD reference signal set associated with the full-duplex mode of the UE and the second BFD resource configuration includes second BFD reference signal resources for a second BFD reference signal set associated with the half-duplex mode of the UE; transmit, to the UE, the first BFD reference signal set in one or more slots configured for the full-duplex mode, and the second BFD reference signal set in one or more slots configured for the half-duplex mode; and receive, from the UE, a BFR MAC-CE that includes an indication of a cause of a beam failure detected by the UE.

In some aspects, a method of wireless communication performed by a base station includes transmitting, to a UE, a first BFD resource configuration for a full-duplex mode of the UE and a second BFD resource configuration for a half-duplex mode of the UE, wherein the first BFD resource configuration includes a first BFD reference signal resources for a first BFD reference signal set associated with the full-duplex mode of the UE and the second BFD resource configuration includes second BFD reference signal resources for a second BFD reference signal set associated with the half-duplex mode of the UE; transmitting, to the UE, the first BFD reference signal set in one or more slots configured for the full-duplex mode, and the second BFD reference signal set in one or more slots configured for the half-duplex mode; and receiving, from the UE, a BFR MAC-CE that includes an indication of a cause of a beam failure detected by the UE.

In some aspects, a non-transitory computer-readable medium storing a set of instructions for wireless communication includes one or more instructions that, when executed by one or more processors of a base station, cause the base station to: transmit, to a UE, a first BFD resource configuration for a full-duplex mode of the UE and a second BFD resource configuration for a half-duplex mode of the UE, wherein the first BFD resource configuration includes a first BFD reference signal resources for a first BFD reference signal set associated with the full-duplex mode of the UE and the second BFD resource configuration includes second BFD reference signal resources for a second BFD reference signal set associated with the half-duplex mode of the UE; transmit, to the UE, the first BFD reference signal set in one or more slots configured for the full-duplex mode, and the second BFD reference signal set in one or more slots configured for the half-duplex mode; and receive, from the UE, a BFR MAC-CE that includes an indication of a cause of a beam failure detected by the UE.

In some aspects, an apparatus for wireless communication includes means for transmitting, to a UE, a first BFD resource configuration for a full-duplex mode of the UE and a second BFD resource configuration for a half-duplex mode of the UE, wherein the first BFD resource configuration includes a first BFD reference signal resources for a first BFD reference signal set associated with the full-duplex mode of the UE and the second BFD resource configuration includes second BFD reference signal resources for a second BFD reference signal set associated with the half-duplex mode of the UE; means for transmitting, to the UE, the first BFD reference signal set in one or more slots configured for the full-duplex mode, and the second BFD reference signal set in one or more slots configured for the half-duplex mode; and means for receiving, from the UE, a BFR MAC-CE that includes an indication of a cause of a beam failure detected by the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
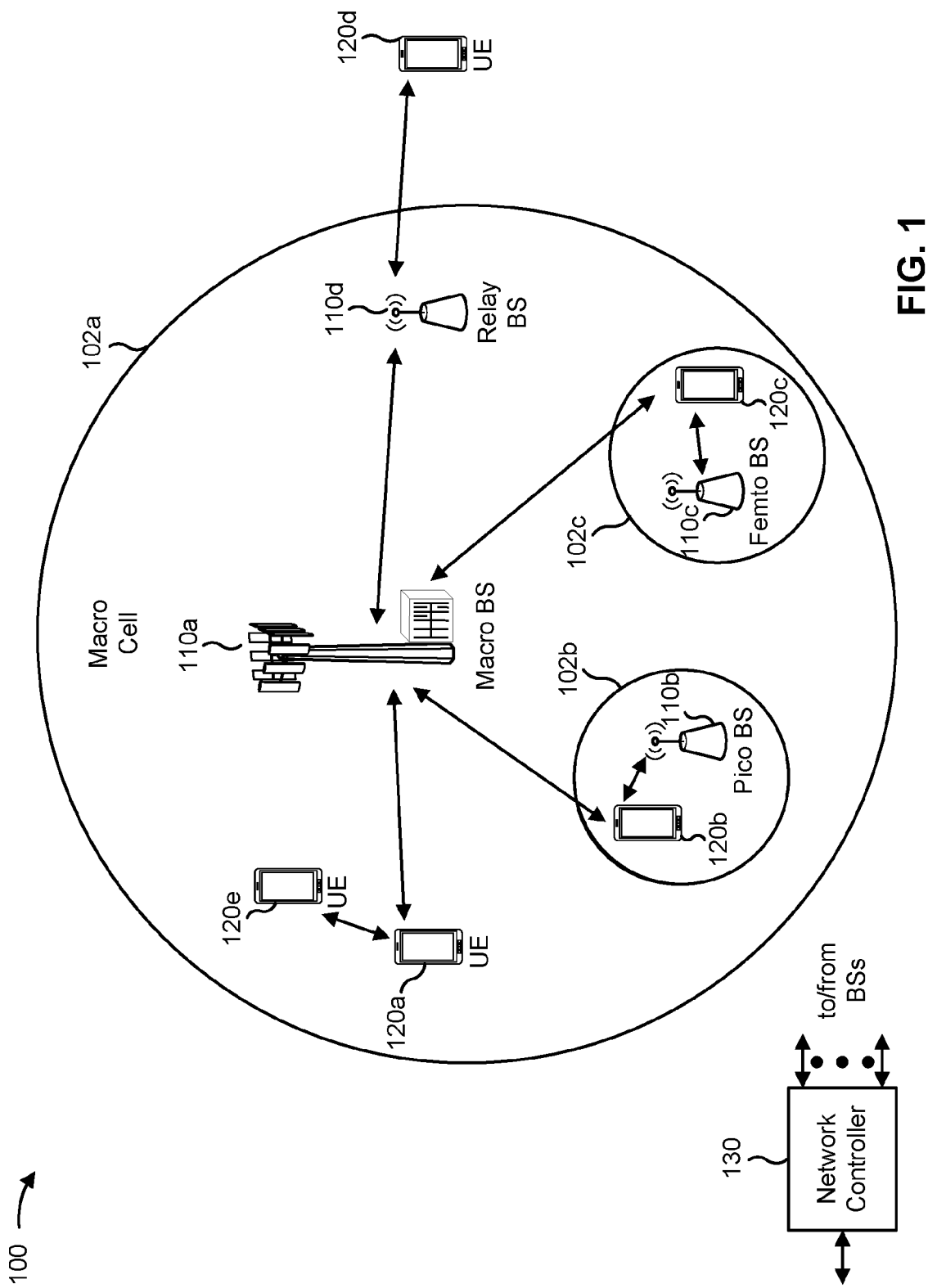
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
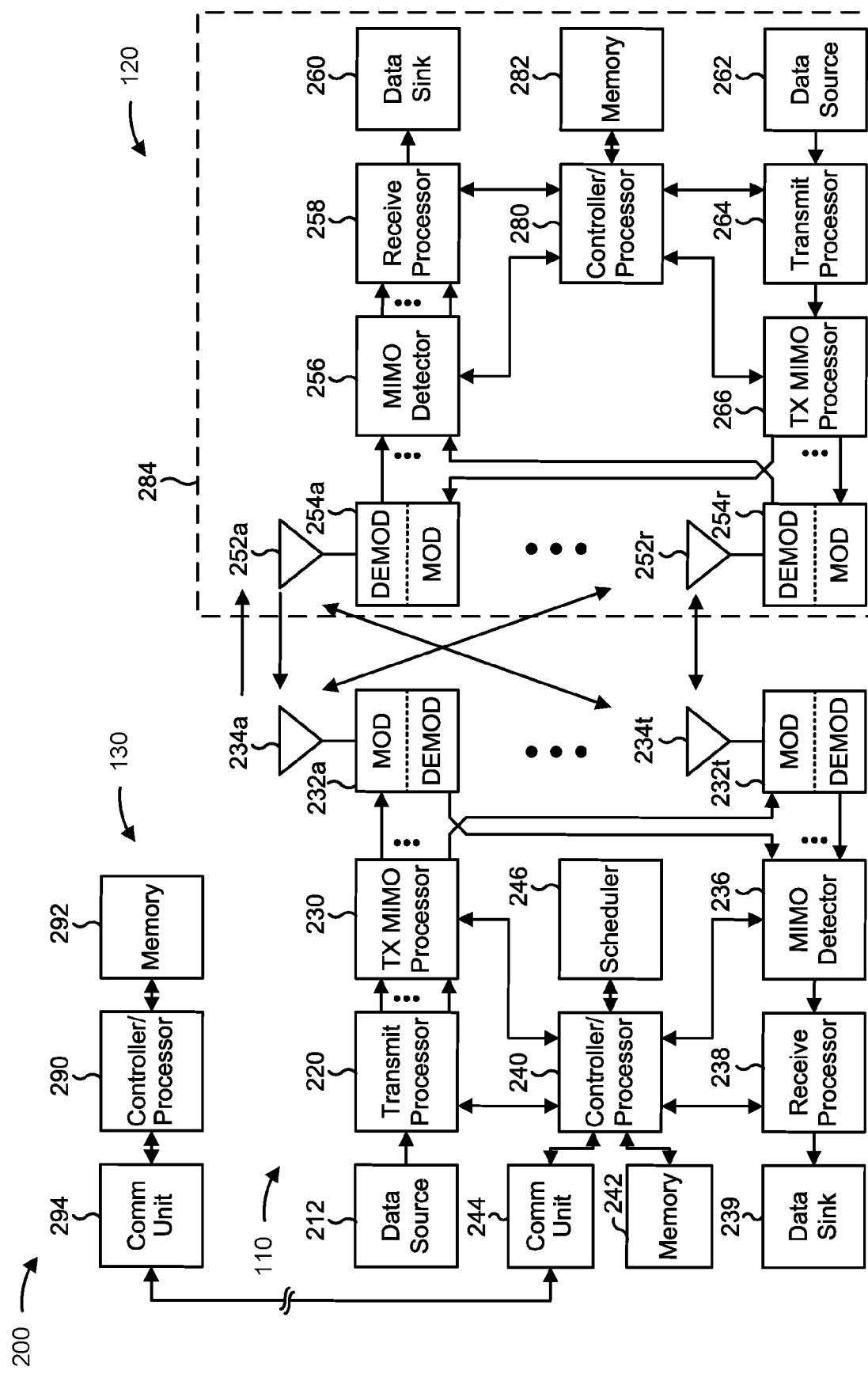
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 7-12).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 7-12).

Controller/processor 240 of base station 110, controller/processor 280 of UE 120, and/or any other component(s) of FIG. 2 may perform one or more techniques associated with beam failure detection (BFD) in full-duplex operation, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, the UE 120 includes means for receiving, from a base station, a beam failure detection (BFD) reference signal set in one or more slots in a full-duplex mode and in one or more slots in a half-duplex mode; means for detecting beam failure due to self-interference based at least in part on a comparison of measurements of the BFD reference signal set in the full-duplex mode and half-duplex mode; and/or means for switching from the full-duplex mode to the half-duplex mode for slots configured for the full-duplex mode based at least in part on detecting beam failure due to self-interference. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for receiving, from a base station, a first BFD reference signal set in one or more slots in a full-duplex mode, and a second BFD reference signal set in one or more slots in a half-duplex mode; means for detecting beam failure in the full-duplex mode based at least in part on the first BFD reference signal set; means for detecting a cause of the beam failure in the full-duplex mode based at least in part on measurements of the first BFD reference signal set in the full-duplex mode and measurements of the second BFD reference signal set in the half-duplex mode; and/or means for transmitting, to the base station in a beam failure recovery (BFR) medium access control (MAC) control element (MAC-CE), an indication of the cause of the beam failure. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station 110 includes means for transmitting, to a UE, a first BFD resource configuration for a full-duplex mode of the UE and a second BFD resource configuration for a half-duplex mode of the UE, wherein the first BFD resource configuration includes a first BFD reference signal resources for a first BFD reference signal set associated with the full-duplex mode of the UE and the second BFD resource configuration includes second BFD reference signal resources for a second BFD reference signal set associated with the half-duplex mode of the UE; means for transmitting, to the UE, the first BFD reference signal set in one or more slots configured for the full-duplex mode, and the second BFD reference signal set in one or more slots configured for the half-duplex mode; or means for receiving, from the UE, a BFR MAC-CE that includes an indication of a cause of a beam failure detected by the UE. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
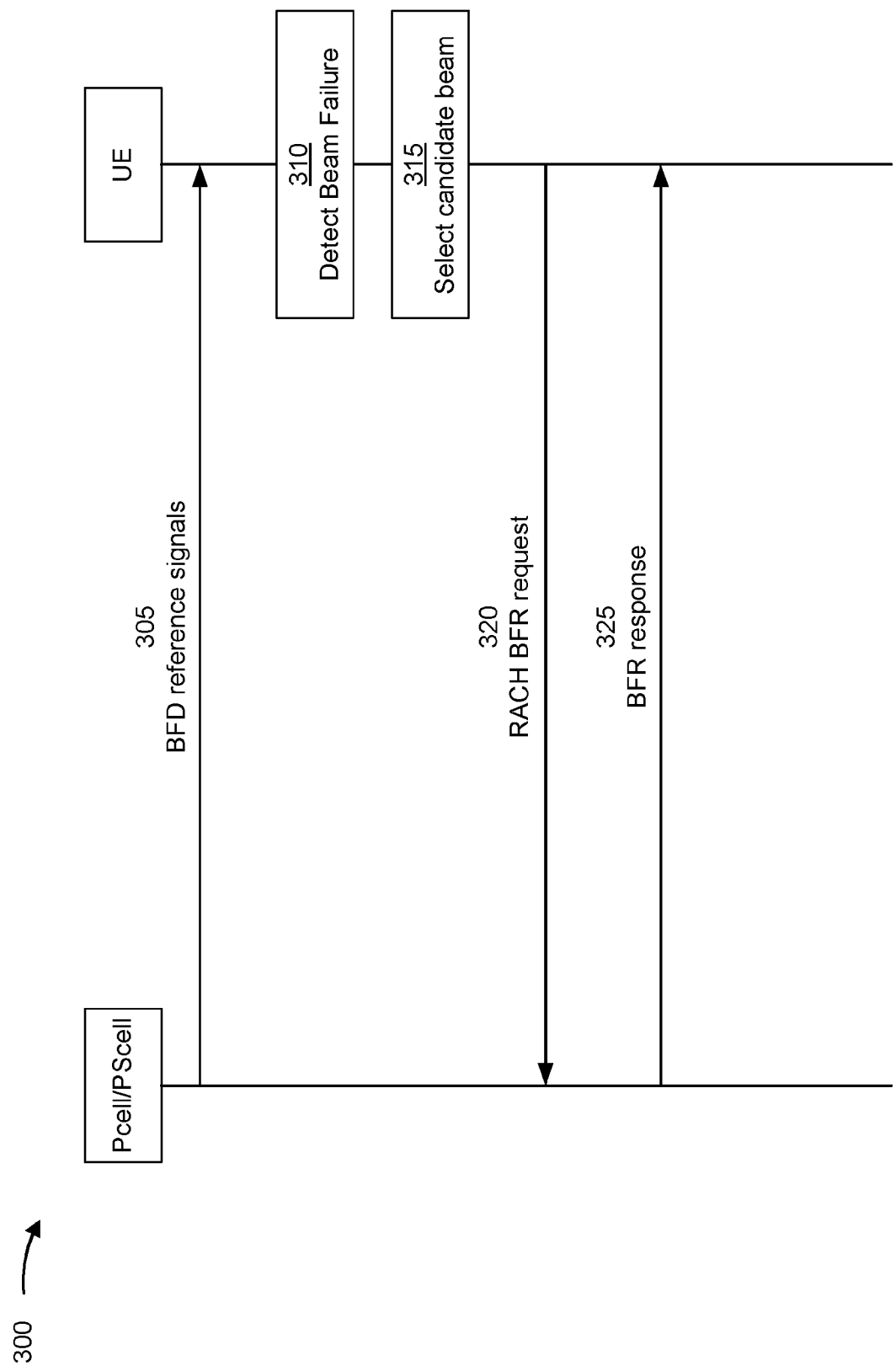
FIG. 3 is a diagram illustrating an example of beam failure detection (BFD) and beam failure recovery (BFR), in accordance with the present disclosure.

FIG. 3 is a diagram illustrating an example 300 of BFD and beam failure recovery (BFR), in accordance with the present disclosure. Example 300 shows BFR for a primary carrier component, or primary cell (Pcell), configured for a UE. Carrier aggregation is a technology that enables two or more component carriers (sometimes referred to as carriers) to be combined (e.g., into a single channel) for a UE to enhance data capacity. In carrier aggregation, a UE may be configured with a primary carrier or Pcell and one or more secondary carriers or secondary cells (Scells). In some aspects, the Pcell may carry control information for scheduling data communications on the one or more Scells. The BFR shown in FIG. 3 may be used for the Pcell in a case in which carrier aggregation is configured for the UE. The BFR shown in FIG. 3 may also be used for a PScell (e.g., a Pcell of a secondary cell group) in a case in which dual connectivity and carrier aggregation are configured for the UE.

As shown in FIG. 3, and by reference number 305, a UE may receive (e.g., on the Pcell or PScell) BFD reference signals transmitted by a base station. The UE may perform BFD based at least in part on measurements performed on the BFD reference signals. The BFD reference signals may include channel state information reference signals (CSI-RSs) transmitted using periodic CSI-RS resources configured via a parameter in a radio resource control (RRC) message. Additionally, or alternatively, the BFD reference signals may include synchronization signal blocks (SSBs). In some examples, a BFD reference signal set may be configured with up to two reference signals associated with a single antenna port. In a case in which the BFD reference signal set is not configured by the base station, reference signal sets indicated by active transmission configuration indicator (TCI) states of control resource sets (CORESETs) monitored by the UE may be used for BFD. In some examples, in a case in which, for an active CORESET, there are two reference signal indices, the reference signal having a quasi co-location (QCL) parameter of type D may be used for BFD.

As shown by reference number 310, the UE may detect a beam failure based at least in part on the BFD reference signals. The physical layer in the UE may assess radio link quality by measuring RSRP of the BFD reference signals and comparing the RSRP measurements with a threshold (Qout). If the RSRP measurements are less than Qout, the physical layer may provide a beam failure indication (e.g., out of service indication) to a higher layer of the UE (e.g., the medium access control (MAC) layer), which may increment a beam failure indicator counter. The UE may detect beam failure based at least in part on a threshold number of beam failure indications within a certain time duration (e.g., a BFD timer).

As shown by reference number 315, based at least in part on detecting a beam failure, the UE may perform candidate beam detection to select a candidate beam for BFR. The UE may perform candidate beam detection based at least in part on periodic CSI-RSs and/or SSBs configured for a number of beam candidates. In some examples, CSI-RS/SSB resources may be configured for up to 16 beam candidates with corresponding random access preamble indices. Upon a request from a higher layer (e.g., the MAC layer), the physical layer of the UE may detect a reference signal with an RSRP that satisfies a threshold (Qin) and provide the reference signal index to the higher layers.

As shown by reference number 320, the UE may then transmit a random access channel (RACH) BFR request to the base station. For example, the UE may initiate a contention free RACH procedure based on the random access resource (e.g., the random access preamble index) associated with the selected reference signal index corresponding to the selected candidate beam.

As shown by reference number 325, the UE may receive a BFR response based at least in part on transmitting the RACH BFR request. The UE may monitor a physical downlink control channel (PDCCH) search space set to detect a PDCCH communication with downlink control information (DCI) format with a cyclic redundancy check (CRC) scrambled by a cell radio network temporary identifier (C-RNTI) or an MCS cell radio network temporary identifier (MCS-C-RNTI), starting a certain number of slots after transmitting the RACH request (e.g., starting from slot n+4). In this case, the UE monitors for a random access response (e.g., the PDCCH communication), which is the BFR response. The search space for the PDCCH monitoring may be identified by a recovery search space ID, and, in some examples, the CORESET associated with a secondary synchronization signal (SSS) provided by the recovery search space ID may not be used for any other SSS. For PDCCH monitoring in the SSS provided by the recovery search space ID and for corresponding physical downlink shared channel (PDSCH) reception, the UE may us the same QCL parameters as those associated with the reference signal index selected during candidate beam selection (e.g., the QCL parameters associated with the selected candidate beam) until the UE receives an activation for a TCI state associated with another beam.

In a case in which the UE receives the PDCCH communication with CRC scrambled by C-RNTI or MCS-C-RNTI within a time window associated with the contention free RACH procedure, the BFR may be complete for the UE. In this case, after a certain number of symbols (e.g., 28 symbols) from a last symbols of the first PDCCH reception, in the search space being monitored by the UE, for which the UE detects a DCI format scrambled by C-RNTI or MCS-C-RNTI, the UE may use the same QCL parameters as those associated with the selected reference signal index for PDCCH monitoring in a CORESET with index 0.

In a case in which the UE does not receive the PDCCH communication with CRC scrambled by C-RNTI or MCS-C-RNTI with the time window associated with the contention free RACH procedure, the UE may initiate a contention-based RACH procedure to transmit the BFR request to the base station. The UE may then monitor the search space for a PDCCH communication with CRC scrambled by C-RNTI or MCS-C-RNTI in response to the contention-based RACH request. In a case, in which the UE does not receive the BFR response in a time window associated with the contention-based RACH procedure, or in a case in which a BFR timer, which starts upon detection of beam failure, expires prior to receiving a BFR response, the UE may declare a radio link failure.

As indicated above, FIG. 3 is provided as an example. Other examples may differ from what is described with respect to FIG. 3.

Figure 4:
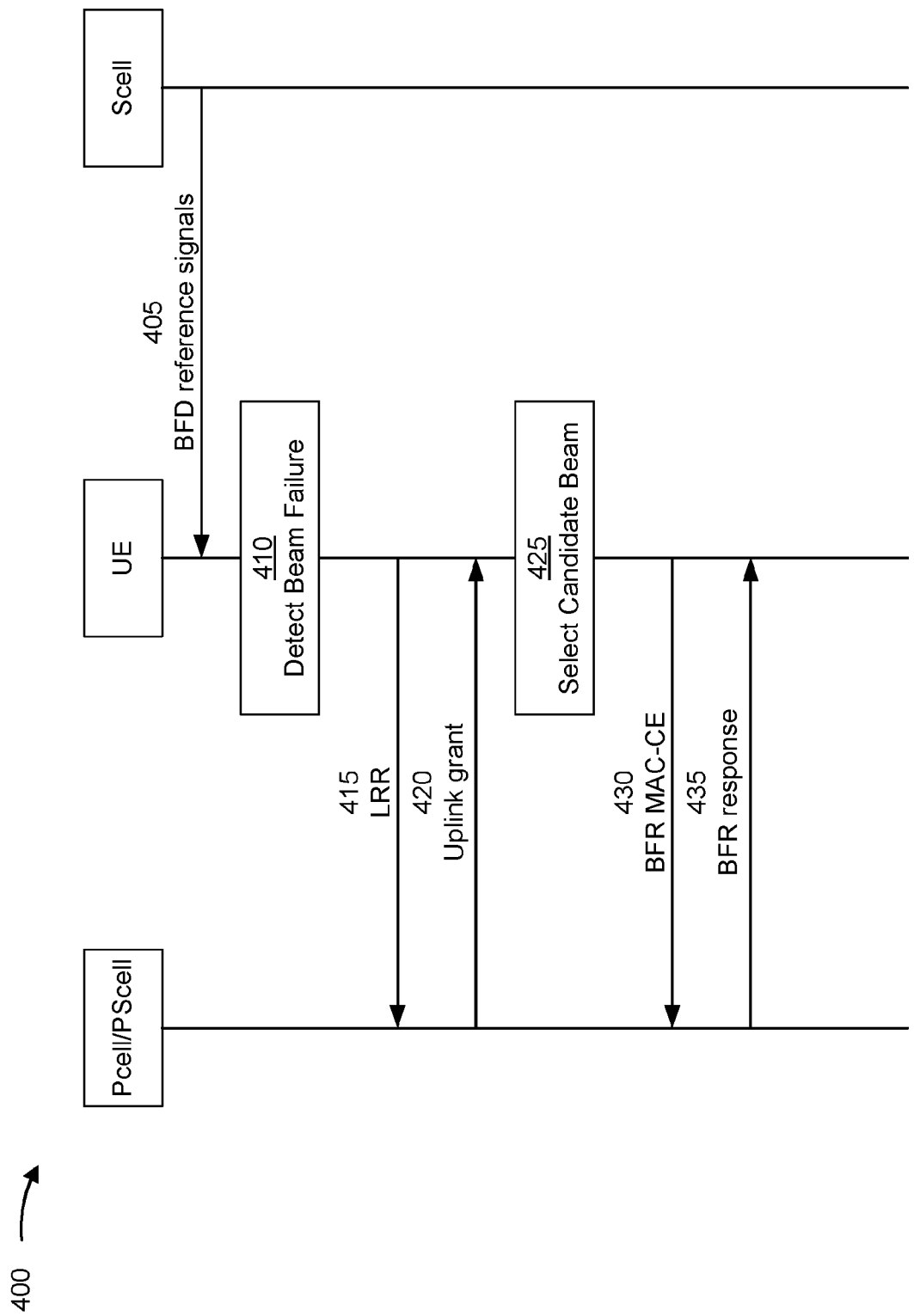
FIG. 4 is a diagram illustrating an example of BFR for a secondary cell (Scell), in accordance with the present disclosure.

FIG. 4 is a diagram illustrating an example 400 of BFR for an Scell, in accordance with the present disclosure. As described above, an Scell is a secondary component carrier configured for a UE in carrier aggregation.

As shown in FIG. 4, and by reference number 405, the UE may receive BFD reference signals on the Scell. The UE may perform BFD based at least in part on measurements (e.g., RSRP measurements) performed on the BFD reference signals. As shown by reference number 410, the UE may detect beam failure on the Scell based at least in part on the measurements performed on the BFD reference signals.

As shown by reference number 415, the UE may transmit, to a base station on the Pcell or PScell, a link recovery request (LRR). In some examples, the UE may transmit the LRR on an Scell configured with a physical uplink control channel (PUCCH) (PUCCH-Scell), in which PUCCH BFR is configured. This LRR may be a scheduling request for requesting an uplink grant to schedule an uplink transmission of a BFR MAC control element (MAC-CE). For example, the LRR may be a PUCCH communication that uses PUCCH format 0 or PUCCH format 1.

As shown by reference number 420, the base station may transmit, to the UE on the Pcell, PScell, or PUCCH-Scell, an uplink grant based at least in part on the LRR. For example, the uplink grant may be included in DCI with CRC scrambled with C-RNTI or MCS-C-RNTI. The uplink grant may schedule a physical uplink shared channel (PUSCH) resource in which the UE may transmit the BFR MAC-CE.

As shown by reference number 425, the UE may perform candidate beam detection to select a candidate beam for BFR. The UE may be configured to receive a reference signal (or reference signal set) on each beam of a list of candidate beams. In some examples, the UE may be configured with up to 64 reference signal resources (corresponding to 64 beams). The UE may receive the reference signals on different beams on the failed Scell or another component carrier in a same frequency band as the failed Scell. In this case, the UE is not performing a RACH procedure, so the reference signal resources configured for the candidate beams may not be associated with RACH resources. The UE may select a candidate beam for which the RSRP of corresponding reference signals satisfies a threshold (Qin).

As shown by reference number 430, the UE may transmit, to the base station, the BFR MAC-CE. For example, the UE may transmit the BFR MAC-CE using the PUSCH resource scheduled by the uplink grant. Alternatively, in some examples, if the UE has an already scheduled uplink grant, the UE may transmit the BFR MAC-CE in the already scheduled uplink grant without transmitting the LRR or receiving the uplink grant. The BFR MAC-CE may include an indication of the failed Scell (e.g., an index of the Scell) and an indication of the selected candidate beam for the Scell. Because the BFR MAC-CE may be transmitted in a scheduled PUSCH resource, the BFR MAC-CE may be transmitted on any component carrier, including the Scell.

As shown by reference number 435, the UE may receive, from the base station, a BFR response. In this case, the BFR response may be a response to the BFR MAC-CE. The response to the BFR MAC-CE may be an uplink grant to schedule a new transmission (e.g., with a toggled new data indicator (NDI)) for a same hybrid automatic repeat request (HARQ) process as the PUSCH transmission carrying the BFR MAC-CE. In a case in which a new beam (e.g., the selected beam candidate) is reported in the BFR MAC-CE after a certain number of symbols (e.g., 28 symbols) from the end of the BFR response (e.g., the end of the PDCCH communication), all CORESET beams on the failed Scell may be reset to the new beam. In a case in which the failed Scell is a PUCCH-Scell, spatial relationship information for the PUCCH may be configured for the new beam after the certain number of symbols (e.g., 28 symbols) from the end of the BFR response. In a case in which the LRR is not transmitted on the failed Scell, PUCCH beams on the failed Scell may be reset to the new beam after the certain number of symbols (e.g., 28 symbols) from the end of the BFR response.

As indicated above, FIG. 4 is provided as an example. Other examples may differ from what is described with respect to FIG. 4.

Figure 5:
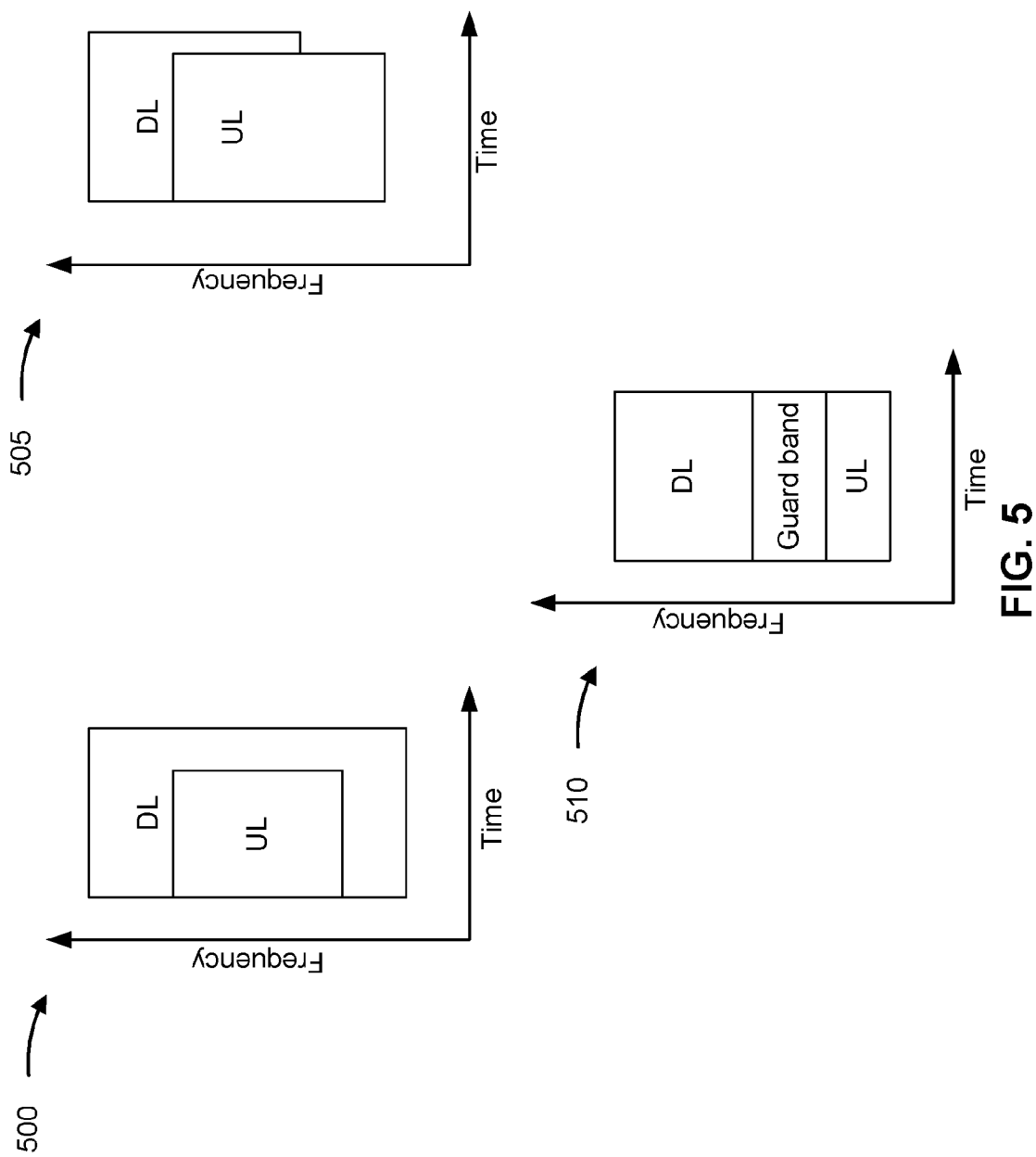
FIG. 5 is a diagram illustrating examples of full-duplex communication in a wireless network, in accordance with the present disclosure.

FIG. 5 is a diagram illustrating examples 500, 505, and 510 of full-duplex communication in a wireless network, in accordance with the present disclosure. "Full-duplex communication" in a wireless network refers to simultaneous bi-direction communication between devices in the wireless network. For example, a UE operating in a full-duplex mode may transmit uplink communications and receive downlink communications at the same time (e.g., in the same slot).

As shown in FIG. 5, examples 500 and 505 show examples of in-band full duplex (IBFD) communication. In IBFD, a UE may transmit uplink communications to a base station and receive downlink communications from the base station on the same time and frequency resources. As shown in example 500, in IBFD, the time and frequency resources for uplink communication may fully overlap with the time and frequency resources for downlink communication. As shown in example 505, in IBFD, the time and frequency resources for uplink communication may partially overlap with the time and frequency resources for downlink communication.

As further shown in FIG. 5, example 510 shows an example of sub-band full duplex, which may also be referred to as "sub-band frequency division duplex (FDD)" or "flexible duplex." In sub-band full duplex, a UE may transmit uplink communications to a base station and receive downlink communications from the base station at the same time, but on different frequency resources. In this case, the downlink resource may be separated from the uplink resource, in the frequency domain, by a guard band.

As indicated above, FIG. 5 is provided as an example. Other examples may differ from what is described with respect to FIG. 5.

Figure 6:
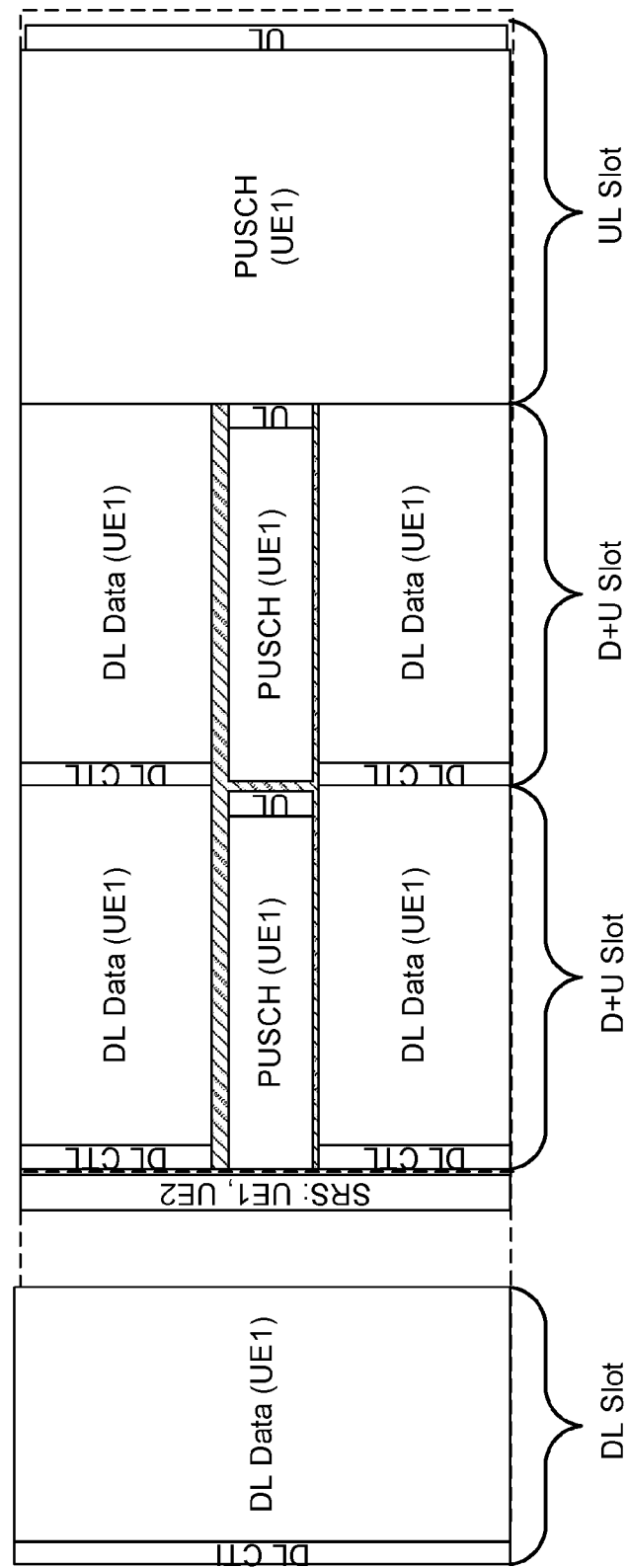
FIG. 6 is a diagram illustrating an example of a slot format for sub-band full-duplex communication, in accordance with the present disclosure.

FIG. 6 is a diagram illustrating an example 600 of a slot format for sub-band full-duplex (e.g., sub-band FDD) communication, in accordance with the present disclosure. As shown in FIG. 6, example 600 includes a downlink slot (DL slot), downlink and uplink slots (D+U slots), and an uplink slot (UL slot). A D+U slot is a slot in which the frequency band may be used for both uplink (e.g., PUSCH) and downlink (e.g., PDSCH) transmissions. In IBFD, the uplink and downlink transmissions in a D+U slot may occur in overlapping frequency bands. In sub-band full-duplex (as shown in FIG. 6), the uplink and downlink transmissions in a D+U slot may occur in different frequency bands. In some examples, the uplink and downlink frequency bands may be adjacent frequency bands and/or frequency bands separated by a guard band.

A D+U slot may include multiple D+U symbols. In a given D+U symbol or slot, a full-duplex UE (e.g., a UE operating in a full-duplex mode) may transmit an uplink communication in the uplink frequency band and/or receive a downlink communication in the downlink frequency band in the same symbol or slot. However, in a given D+U symbol or slot, a half-duplex UE (e.g., a UE operating in a half-duplex mode) may either transmit an uplink communication in the uplink frequency band or receive a downlink communication in the downlink frequency band. A D+U slot may include downlink only symbols, uplink only symbols, and/or full-duplex symbols.

As shown in FIG. 6, in some examples, an operating mode for sub-band full-duplex communication may utilize FDD in unpaired spectrum bands for downlink and uplink communications. As shown in FIG. 6, the D+U slots may include uplink and downlink resources for a first UE (UE1) operating in a full-duplex mode and may include resources (e.g., downlink resources) for a second UE (UE2) operating in a half-duplex mode.

As indicated above, FIG. 6 is provided as an example. Other examples may differ from what is described with respect to FIG. 6.

In some case, a UE operating in a full-duplex mode may perform BFD and BFR, as described above. However, when operating in the full-duplex mode, the UE may not be able to determine a cause of a detected beam failure. For example, the UE may not be able to distinguish between beam failure caused by self-interference due to simultaneous uplink and downlink communications in the full-duplex mode and beam failure caused by degraded link quality between the UE and the base station. This may lead the UE to unnecessarily request BFR (e.g., in a case in which the BFD is due to self-interference caused by full-duplex communication) and may cause the base station to unnecessarily reconfigure the beam for communicating with the UE. As a result, network data rate and reliability may be decreased, and latency of uplink and downlink traffic for the UE may be increased.

Some techniques and apparatuses described herein enable a UE to receive, from a base station, a BFD reference signal set in one or more slots in a full-duplex mode and in one or more slots in a half-duplex mode. The UE may detect beam failure due to self-interference based at least in part on comparison of measurements of the BFD reference signal set in the full-duplex mode and half-duplex mode. The UE may switch from the full-duplex mode to the half-duplex mode for slots configured for the full-duplex mode based at least in part on detecting beam failure due to self-interference. As a result, the UE may autonomously fall back from the full-duplex mode to the half-duplex mode in connection with detecting beam failure due to self-interference, which may reduce unnecessary BFR requests and/or beam reconfigurations. This may increase network data rate and reliability and decrease latency of uplink and downlink traffic for the UE.

Some techniques and apparatuses described herein enable a UE to receive, from a base station, a first BFD reference signal set in one or more slots in a full-duplex mode and a second BFD reference signal set in one or more slots in a half-duplex mode. The UE may detect beam failure in the full-duplex mode based at least in part on the first BFD reference signal set, or the UE may detect beam failure in the half-duplex mode based at least in part on the second BFD set. The UE may detect a cause of the beam failure. For example, the UE may detect a cause of beam failure in the full-duplex mode based at least in part on measurements of the first BFD reference signal set in the full-duplex mode and measurements of the second BFD reference signal set in the half-duplex mode. The UE may transmit, to the base station in a BFR MAC-CE, an indication of the cause of the beam failure. As a result, the base station may determine whether to reconfigure the beam based at least in part on the cause of the beam failure. This may reduce unnecessary beam reconfigurations, which may increase network data rate and reliability and decrease latency of uplink and downlink traffic for the UE.

Figure 7:
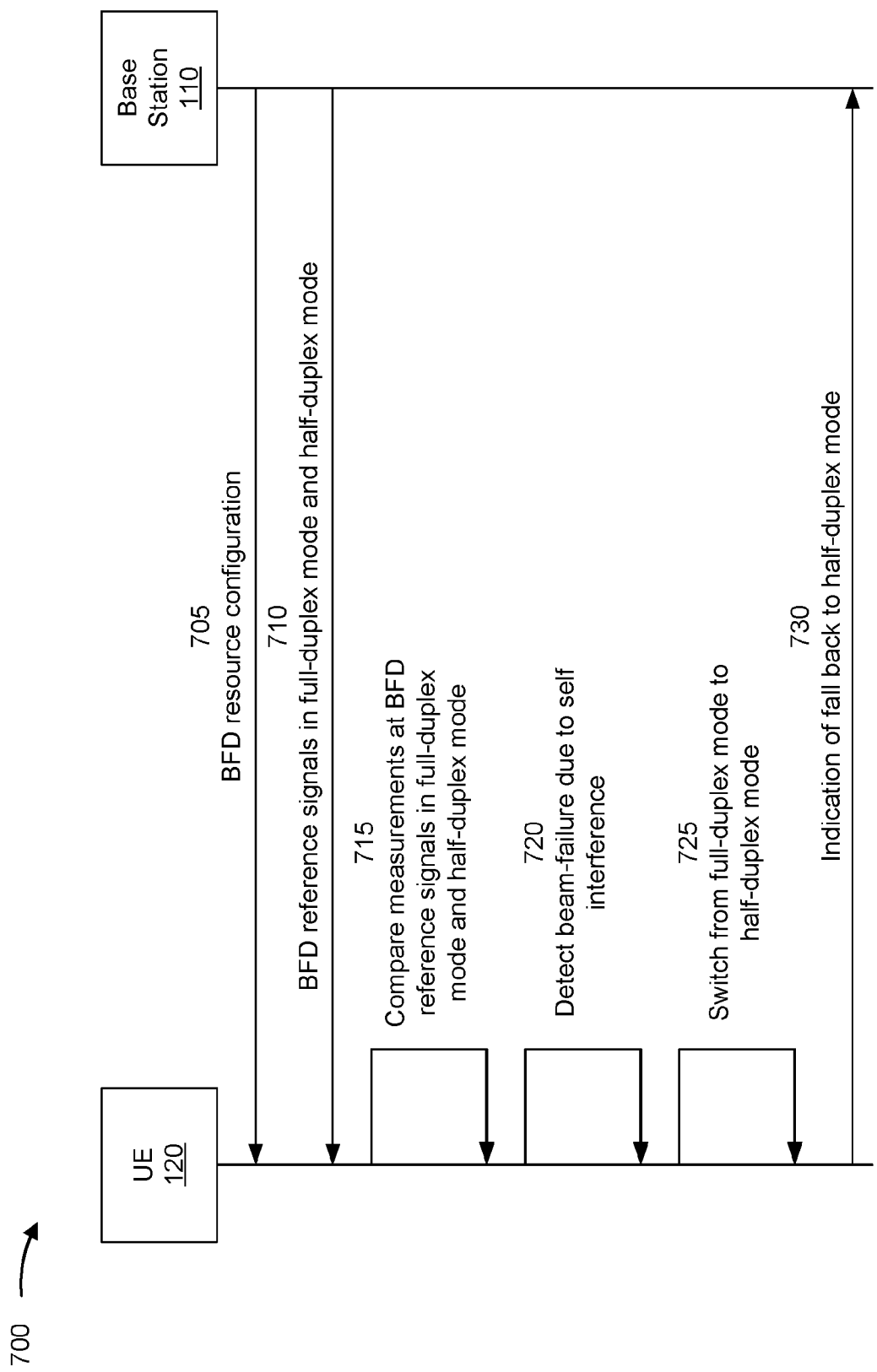
FIGS. 7-8 are diagrams illustrating examples associated with BFD in full-duplex operation, in accordance with the present disclosure.

FIG. 7 is a diagram illustrating an example 700 associated with BFD in full-duplex operation, in accordance with the present disclosure. As shown in FIG. 7, example 700 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 7, and by reference number 705, the base station 110 may transmit, and the UE 120 may receive, a BFD resource configuration. The BFD resource configuration may include information that configures parameters relating to BFD and BFR for the UE 120. In some aspects, the BFD resource configuration may indicate BFD reference signal resources for a BFD reference signal a beam failure threshold, a beam failure instance counter threshold, a BFD timer duration, and BFR resources. The BFD reference signal resources may indicate time and frequency resources to be used for transmitting a BFD reference signal set from the base station 110 to the UE 120. The BFD reference signal resources may also indicate a periodicity associated with transmitting the BFD reference signal set to the UE 120. The BFD reference signal set may include one or more reference signals (e.g., SSB and/or CSI-RS). In some aspects, the BFD resource configuration may configure the same SSB/CSI-RS resource set to be transmitted to the UE 120 in both full-duplex and half-duplex modes. For example, the BFD references signal resources may be configured with the same frequency domain resource allocation in full-duplex slots (e.g., slots configured for the full-duplex mode) and in half-duplex slots (e.g., slots configured for the half-duplex mode).

The beam failure threshold may be a threshold for a measurement (e.g., RSRP measurement) of a BFD reference signal that is used, by the UE 120, to determine whether a beam failure instance has occurred. The beam failure instance counter threshold may be a threshold for a beam failure instance counter that is used, by the UE 120, to determine when beam failure is detected. The BFD timer duration may be a time duration during which a beam failure may be detected in a case in which a number of beam failure instances exceeds the beam failure instance counter threshold. In some aspects, the BFR resources, included in the BFD resource configuration, may include resources for requesting BFR. For example, the BFR resources may include SSB/CSI resources for candidate beams for BFR, random access preamble indices associated with the candidate beams, and/or time and frequency resources for transmitting an LRR (or other scheduling request) for an uplink grant for transmitting a BFR MAC-CE.

As further shown in FIG. 7, and by reference number 710, the base station 110 may transit, to the UE 120, BFD reference signals in full-duplex slots (e.g., slots configured for the full-duplex mode) or half-duplex slots (e.g., slots configured for the half-duplex mode). The UE 120 may receive the BFD reference signals in the full-duplex mode (e.g., in the full-duplex slots) and in the half-duplex mode. For example, the base station 110 may transmit, and the UE 120 may receive, the one or more BFD reference signals in the BFD reference signal set in one or slots in the full-duplex mode and in one or more slots of the half-duplex mode. The base station 110 may transmit the BFD reference signal set to the UE 120 using the configured BFD reference signal resources indicated in the BFD resource configuration. In some aspects, the UE 120 may receive the BFD reference signal set on resources having the same frequency domain resource allocation in the full-duplex slots and in the half-duplex slots.

In some aspects, the UE 120 may perform measurements on the BFD reference signal set received in full-duplex mode and half-duplex mode. For example, the UE 120 may perform received signal strength measurements (e.g., RSRP measurements) and/or quality measurements (e.g., signal-to-interference-plus-noise ratio (SINR) measurements and/or RSRQ measurements) on the received BFD reference signals in the full-duplex mode and the half-duplex mode. In some aspects, the UE 120 may perform BFD based at least in part on the measurements performed on the BFD reference signal set. For example, the UE 120 may compare RSRP measurements of the BFD reference signals to the beam failure threshold, and the UE 120 may detect a beam failure instance based at least in part on an RSRP measurement failing to satisfy the beam failure threshold. The UE 120 may increment a beam failure instance counter in connection with detecting a beam failure instance. The UE 120 may detect beam failure based at least in part on the beam failure instance counter satisfying the beam failure instance counter threshold within the BFD timer duration.

As further shown in FIG. 7, and by reference number 715, the UE 120 may compare measurements of the BFD reference signals in the full-duplex mode and the half-duplex mode. In some aspects, the UE 120 may perform a first measurement (e.g., a first SINR measurement) on the BFD reference signal set in the full-duplex mode and a second measurement (e.g., second SINR measurement) performed on the BFD reference signal set in the half-duplex mode. For example, the first measurement (e.g., the first SINR measurement) may be performed on the BFD reference signal set in one or more full-duplex slots, and the second measurement (e.g., the second SINR measurement) may be performed on the BFD reference signal set in one or more half-duplex slots. In some aspects, the UE 120 may determine a difference between the first measurement (e.g., the first SINR measurement) and the second measurement (e.g., the second SINR measurement).

As further shown in FIG. 7, and by reference number 720, the UE 120 may detect beam failure due to self-interference based at least in part on the comparison of the measurements of the BFD reference signals in the full-duplex mode and the half-duplex mode. The UE 120 may determine whether the difference between the first measurement (e.g., the first SINR measurement) and the second measurement (e.g., the second SINR measurement) satisfies a threshold. In some aspects, the threshold may be configured, for example, in the BFD resource configuration. In some aspects, the UE 120 may detect beam failure due to self-interference based at least in part on a determination that the difference between the first measurement (e.g., the first SINR measurement) and the second measurement (e.g., the second SINR measurement) satisfies the threshold. For example, a lower SINR measurement in the full-duplex mode than in the half-duplex mode may indicate self-interference between an uplink communication and the measured reference signal in the full-duplex mode.

In some aspects, the UE 120 may detect the beam failure due to self-interference based at least in part on detecting beam failure in the full-duplex mode and based at least in part on the determination that the difference between the first measurement (e.g., the first SINR measurement) and the second measurement (e.g., the second SINR measurement) satisfies the threshold. In this case, the comparison between the first measurement (e.g., the first SINR measurement) and the second measurement (e.g., the second SINR measurement) may be performed in connection with detecting the beam failure in the full-duplex mode in order to determine whether the detected beam failure is due to self-interference.

As further shown in FIG. 7, and by reference number 725, based at least in part on detecting the beam failure due to self-interference, the UE 120 may switch from the full-duplex mode to the half-duplex mode. In some aspects, the UE 120 may autonomously fall back to the half-duplex mode from the full-duplex mode based at least in part on detecting the beam failure due to self-interference. In this case, the UE 120 may switch from the full-duplex mode to the half-duplex mode for slots (e.g., upcoming slots) configured for the full-duplex mode. In some aspects, the UE 120 may determine whether to drop uplink communications or downlink communications from the upcoming slots configured for the full-duplex mode. For example, the UE 120 may determine whether to drop the uplink communications or the downlink communications based at least in part on priorities associated with the uplink communications and/or the downlink communications.

As further shown in FIG. 7, and by reference number 730, the UE 120 may transmit, to the base station 110, an indication of the fall back to half-duplex mode from the full-duplex mode. In some aspects, based at least in part on switching from the full-duplex mode to the half-duplex mode, the UE 120 may transmit, to the base station 110, a message including an indication that the UE 120 has switched from the full-duplex mode to the half-duplex mode for the slots configured for the full-duplex mode. In some aspects, the message may also include an indication of whether to drop uplink communications or downlink communications from the slots configured for the full-duplex mode.

In some aspects, the base station 110 may configure a new beam for the UE 120 based at least in part on receiving, from the UE 120, the indication of the fall back to the half-duplex mode. For example, the base station 110 may select a new beam that mitigates the self-interference between the uplink and downlink communications in the full-duplex mode. In this case, the base station 110 may transmit, to the UE 120, an indication of the new beam configured for the UE 120. The UE 120 may receive the indication of the new beam from the base station 110, and the UE 120 may switch to the new beam. In some aspects, the base station 110 may determine not to configure a new beam for the UE 120 in connection with receiving the indication of the fall back to the half-duplex mode.

As described above in connection with FIG. 7, the UE 120 may receive, from the base station 110, a BFD reference signal set in one or more slots in a full-duplex mode and in one or more slots in a half-duplex mode. The UE 120 may detect beam failure due to self-interference based at least in part on comparison of measurements of the BFD reference signal set in the full-duplex mode and half-duplex mode. The UE 120 may switch from the full-duplex mode to the half-duplex mode for slots configured for the full-duplex mode based at least in part on detecting beam failure due to self-interference. As a result, the UE 120 may autonomously fall back from the full-duplex mode to the half-duplex mode in connection with detecting beam failure due to self-interference, which may reduce unnecessary BFR requests and/or beam reconfigurations. This may increase network data rate and reliability and decrease latency of uplink and downlink traffic for the UE 120.

As indicated above, FIG. 7 is provided as an example. Other examples may differ from what is described with respect to FIG. 7.

Figure 8:
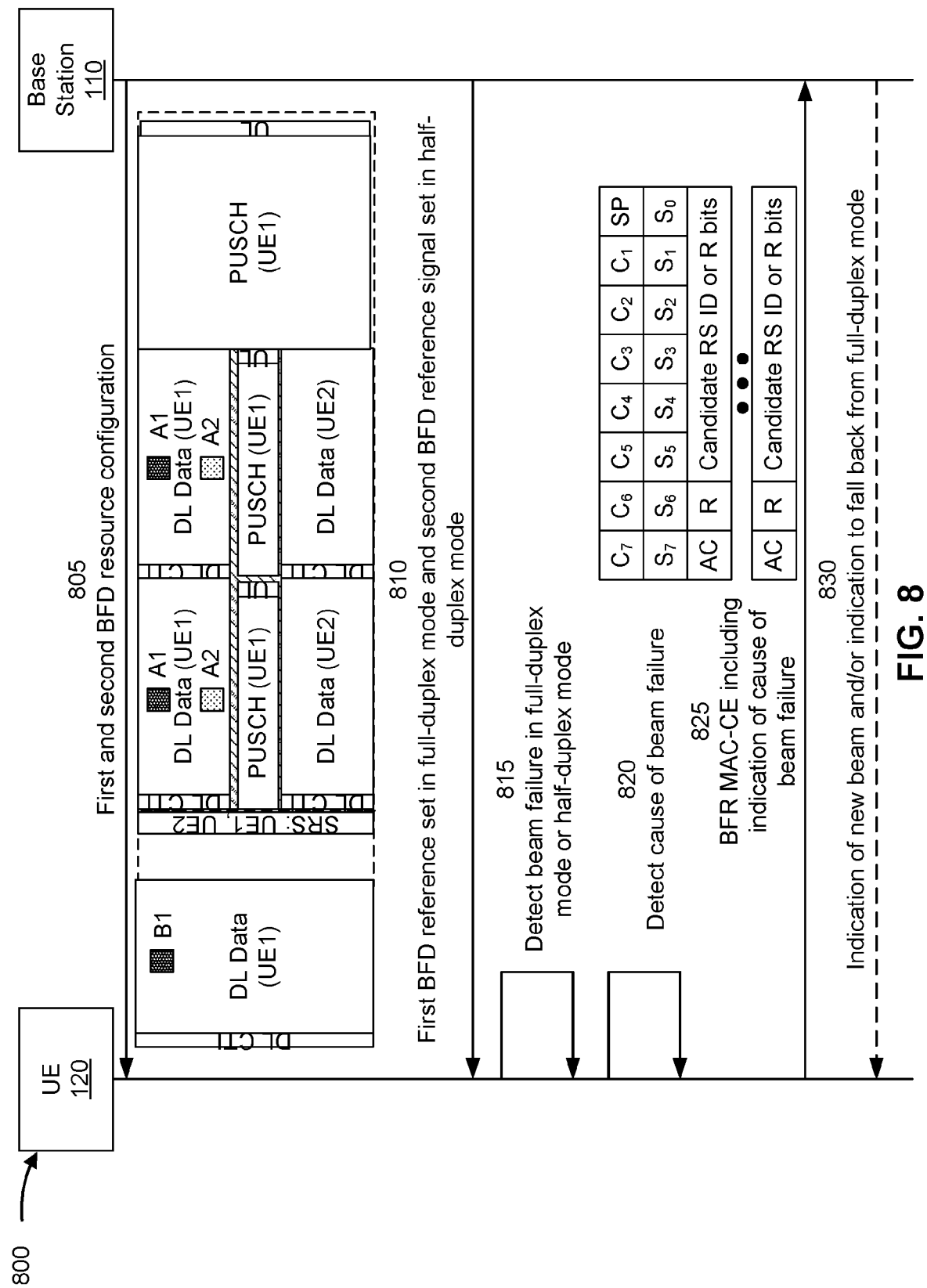

FIG. 8 is a diagram illustrating an example 800 associated with BFD in full-duplex operation, in accordance with the present disclosure. As shown in FIG. 8, example 800 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 8, and by reference number 805, the base station 110 may transmit, and the UE 120 may receive, a first BFD resource configuration for the full-duplex mode and a second BFD resource configuration for the half-duplex mode. The first and second BFD resource configurations may include information that configures separate parameters relating to BFD and BFR for the full-duplex mode and for the half-duplex mode. For example, different BFD reference signal resources, beam failure thresholds, beam failure instance counter thresholds, BFD timer durations, and/or BFR resources may be configured for the full-duplex mode and the half-duplex mode.

In some aspects, the first BFD resource configuration may indicate first BFD reference signal resources for a first BFD reference signal set, and the second BFD resource configuration may indicate second BFD reference signal resources for a second BFD reference signal set. The first BFD reference signal resources may indicate time and frequency resources to be used for transmitting the first BFD reference signal set from the base station 110 to the UE 120 in full-duplex slots. The first BFD reference signal set may include one or more reference signals (e.g., SSB and/or CSI-RS). The second BFD reference signal resources may indicate time and frequency resources to be used for transmitting the second BFD reference signal set from the base station 110 to the UE 120 in half-duplex slots. The second BFD reference signal set may include one or more reference signals (e.g., SSB and/or CSI-RS).

As shown in FIG. 8, in some aspects, the first BFD reference signal set may include a first reference signal subset (A1) and a second reference signal subset (A2). The first reference signal subset (A1), of the first BFD reference signal set, may include one or more reference signals having the same frequency domain resource allocation as the frequency domain resource allocation of one or more reference signals in the second BFD reference signal set (B1). The second reference signal subset (A2), of the first BFD reference signal set, may include one or more reference signals having a different frequency domain resource allocation from the frequency domain resource allocation of the reference signals in the second BFD reference signal set (B1).

In some aspects, the first BFD resource configuration may also indicate a first beam failure threshold, a first beam failure instance counter threshold, a first BFD timer duration, and/or first BFR resources. The first beam failure threshold may be a threshold for a measurement (e.g., RSRP measurement) of a BFD reference signal that is used, by the UE 120, to determine whether a beam failure instance has occurred in the full-duplex mode. The first beam failure instance counter threshold may be a threshold for a beam failure instance counter that is used, by the UE 120, to determine when beam failure is detected in the full-duplex mode. The first BFD timer duration may be a time duration during which a beam failure may be detected in the full-duplex mode, in a case in which a number of beam failure instances exceeds the first beam failure instance counter threshold. In some aspects, the first BFR resources, included in the first BFD resource configuration, may include resources for requesting BFR in connection with a beam failure detected in the full-duplex mode. For example, the first BFR resources may include SSB/CSI resources for candidate beams for BFR, random access preamble indices associated with the candidate beams, and/or time and frequency resources for transmitting an LRR (or other scheduling request) for an uplink grant for transmitting a BFR MAC-CE in connection with a beam failure detected in the full-duplex mode. The UE 120 may use the first BFD reference signals, the first beam failure threshold, the first BFD timer duration, and/or the first BFR resources to perform BFD in the full-duplex mode, as described below in connection with FIG. 9.

In some aspects, the second BFD resource configuration may also indicate a second beam failure threshold, a second beam failure instance counter threshold, a second BFD timer duration, and/or second BFR resources. The second beam failure threshold may be a threshold for a measurement (e.g., RSRP measurement) of a BFD reference signal that is used, by the UE 120, to determine whether a beam failure instance has occurred in the half-duplex mode. The second beam failure instance counter threshold may be a threshold for a beam failure instance counter that is used, by the UE 120, to determine when beam failure is detected in the half-duplex mode. The second BFD timer duration may be a time duration during which a beam failure may be detected in the half-duplex mode, in a case in which a number of beam failure instances exceeds the second beam failure instance counter threshold. In some aspects, the second BFR resources, included in the second BFD resource configuration, may include resources for requesting BFR in connection with a beam failure detected in the half-duplex mode. For example, the second BFR resources may include SSB/CSI resources for candidate beams for BFR, random access preamble indices associated with the candidate beams, and/or time and frequency resources for transmitting an LRR (or other scheduling request) for an uplink grant for transmitting a BFR MAC-CE in connection with a beam failure detected in the half-duplex mode. The UE 120 may use the second BFD reference signals, the second beam failure threshold, the second BFD timer duration, and/or the second BFR resources to perform BFD in the half-duplex mode, as described below in connection with FIG. 9.

As further shown in FIG. 8, and by reference number 810, the base station 110 may transmit, to the UE 120, the first BFD reference signal set in one or more full-duplex slots and the second BFD reference signal set in one or more half-duplex slots. The UE 120 may receive the first BFD reference signal set in one or more slots in the full-duplex mode, and the UE 120 may receive the second BFD reference signal set in one or more slots in the half-duplex mode. The base station 110 may transmit the first BFD reference signal set, in one or more full-duplex slots, using the first BFD reference signal resources indicated in the first BFD resource configuration. The base station 110 may transmit the second BFD reference signal set, in one or more half-duplex slots, using the second BFD reference signal set resources indicated in the second BFD configuration.

As shown in FIG. 8, in one or more half-duplex slots (e.g., DL slots), the UE 120 may receive the one or more reference signals in the second BFD reference signal set (B1). In some aspects, in one or more full-duplex slots (e.g., D+U slots), the UE 120 (e.g., UE) may receive the first BFD reference signal set that includes the first reference signal subset (A1) and the second reference signal subset (A2). The frequency domain resource allocation of the first reference signal subset (A1) may be the same as the frequency domain resource allocation of the second BFD reference signal set (B1). The frequency domain resource allocation of the second reference signal subset (A2) may be different from the frequency domain resource allocation of the second BFD reference signal set (B1).

Figure 9:
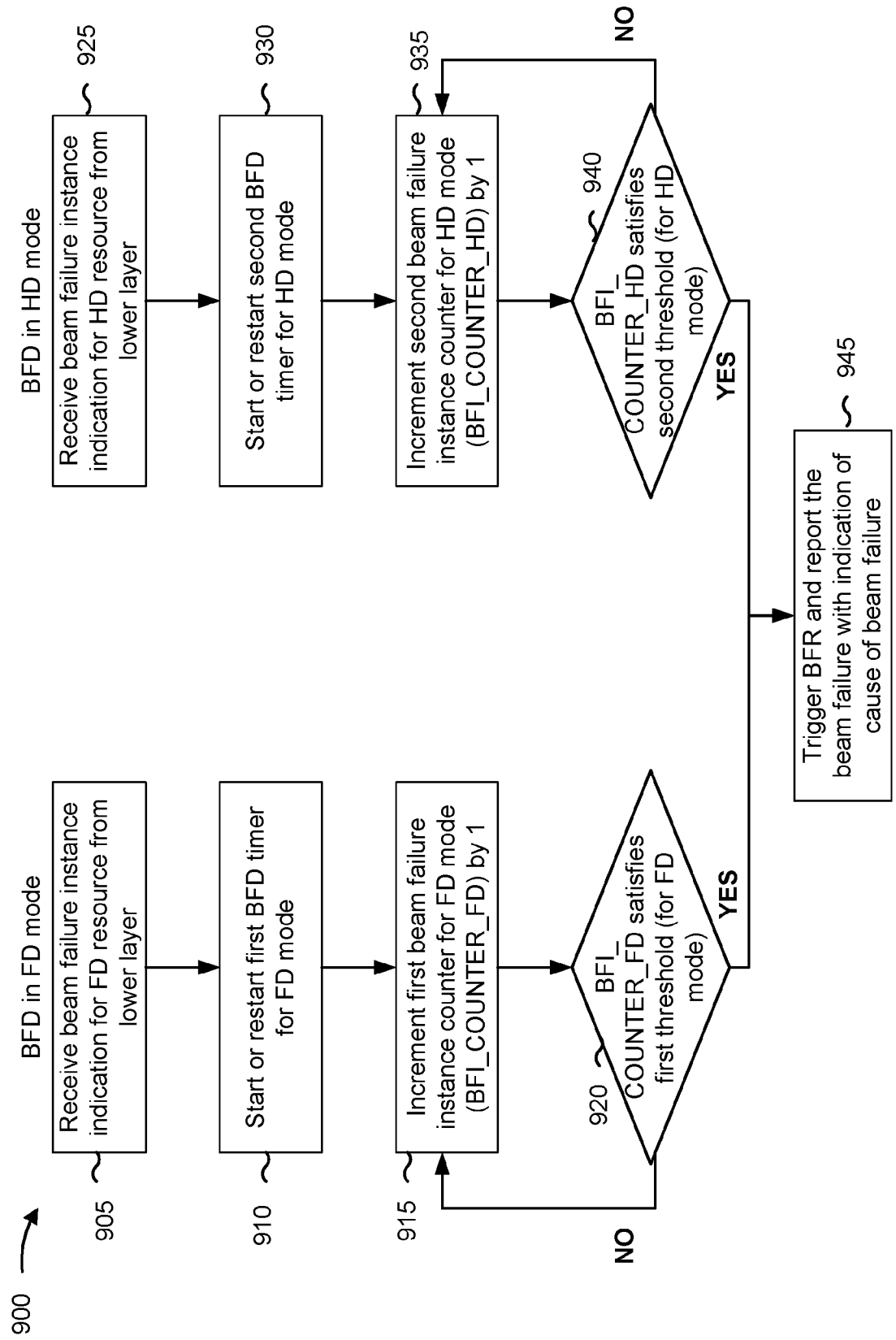
FIG. 9 is a diagram illustrating a process associated with performing BFD in a full-duplex mode and a half-duplex mode.

As further shown in FIG. 8, and by reference number 815, the UE 120 may detect beam failure in the full-duplex mode, and/or the UE 120 may detect beam failure in the half-duplex mode. In some aspects, the UE 120 may separately perform radio link monitoring and BFD in the full-duplex mode and in the half-duplex mode. For example, the UE 120 may be configured with separate beam failure instance counters and BFD timers for the full-duplex mode and the half-duplex mode. In this case, the UE 120 may stop or suspend the respective BFD timer when the UE 120 switches from one duplex mode to another. The BFD, performed by the UE 120, in the full-duplex mode and the half-duplex mode is illustrated in FIG. 9, and described in greater detail below in connection with FIG. 9.

In some aspects, the UE 120 may perform measurements on the first BFD reference signal set received in full-duplex mode. For example, the UE 120 may perform received signal strength measurements (e.g., RSRP measurements) and/or quality measurements (e.g., SINR measurements and/or RSRQ measurements) on the first BFD reference signal set received in the one or more slots in the full-duplex mode. In some aspects, the UE 120 may perform BFD in the full-duplex mode based at least in part on the measurements performed on the first BFD reference signal set. For example, the UE 120 may compare RSRP measurements on the first BFD reference signal set to the first beam failure threshold, and the UE 120 may detect a beam failure instance in the full-duplex mode based at least in part on an RSRP measurement failing to satisfy the first beam failure threshold. The UE 120 may increment a first beam failure instance counter in connection with detecting a beam failure instance in the full-duplex mode. The UE 120 may detect beam failure based at least in part on the first beam failure instance counter satisfying the first beam failure instance counter threshold within the first BFD timer duration. The UE 120 may start or re-start the first BFD timer in connection with a first beam failure instance detected after switching to the full-duplex mode (e.g., from the half-duplex mode). The UE 120 may stop or suspend the first BFD timer when switching from the full-duplex mode to the half-duplex mode.

In some aspects, the UE 120 may perform measurements on the second BFD reference signal set received in half-duplex mode. For example, the UE 120 may perform received signal strength measurements (e.g., RSRP measurements) and/or quality measurements (e.g., SINR measurements and/or RSRQ measurements) on the second BFD reference signal set received in the one or more slots in the half-duplex mode. In some aspects, the UE 120 may perform BFD in the half-duplex mode based at least in part on the measurements performed on the second BFD reference signal set. For example, the UE 120 may compare RSRP measurements on the second BFD reference signal set to the second beam failure threshold, and the UE 120 may detect a beam failure instance in the half-duplex mode based at least in part on an RSRP measurement failing to satisfy the second beam failure threshold. The UE 120 may increment a second beam failure instance counter in connection with detecting a beam failure instance in the half-duplex mode. The UE 120 may detect beam failure based at least in part on the second beam failure instance counter satisfying the second beam failure instance counter threshold within the second BFD timer duration. The UE 120 may start or re-start the second BFD timer in connection with a first beam failure instance detected after switching to the half-duplex mode (e.g., from the full-duplex mode). The UE 120 may stop or suspend the second BFD timer when switching from the half-duplex mode to the full-duplex mode.

As further shown in FIG. 8, and by reference number 820, the UE 120 may detect a cause of the beam failure. In some aspects, the UE 120 may detect whether the cause of the beam failure is a first cause associated with degraded link quality or a second cause associated with self-interference. In some aspects, the UE 120 may determine that the cause of the beam failure is the first cause (e.g., degraded link quality) based at least in part on detecting the beam failure in the half-duplex mode. In some aspects, the UE 120 may detect the cause of a beam failure in the full-duplex mode based at least in part on measurements of the first BFD reference signal set in the full-duplex mode and measurements of the second BFD reference signal set in the half-duplex mode. For example, the UE 120 may detect that the cause of the beam failure in the full-duplex mode is one of the first cause (e.g., degraded link quality) or the second cause (e.g., self-interference) based on the measurements of the first BFD reference signal set and the measurements of the second BFD reference signal set.

In some aspects, the UE 120 may detect the cause of the beam failure in the full-duplex mode based at least in part on a comparison of a first beam measurement (e.g., a first SINR measurement) on the first reference signal subset (A1) of the first BFD reference signal set in one or more full-duplex slots and a second beam measurement (e.g., second SINR measurement) on the second BFD reference signal set (B1) in one or more half-duplex slots. For example, the UE 120 may determine whether a difference between the first beam measurement on the first reference signal subset (A1) and the second beam measurement on the second BFD reference signal set (B1) satisfies a threshold. In some aspects, based at least in part on a determination that the difference between the first beam measurement and the second beam measurement satisfies a threshold, the UE 120 may detect that the cause of the beam failure is the full-duplex mode in the second cause (e.g., self-interference). In some aspects, based at least in part on a determination that the difference between the first beam measurement and the second beam measurement does not satisfy the threshold, the UE 120 may compare beam measurements (e.g., SINR measurements) on the second reference signal subset (A2) of the first BFD reference signal set in different full-duplex slots. In this case, based at least in part on a determination that the difference between the first beam measurement and the second beam measurement does not satisfy the threshold and based at least in part on a determination that a difference between the beam measurements on the second reference signal subset (A2) in different slots satisfies a threshold, the UE 120 may detect that the cause of the beam failure is the first cause (e.g., degraded link quality).

As further shown in FIG. 8, and by reference number 825, the UE 120 may transmit, to the base station 110, a BFR MAC-CE that includes an indication of the cause of the beam failure. In a case in which the beam failure is detected on an Scell, the UE 120 may transmit, to the base station 110 on a Pcell or an SPcell, an LRR (or other scheduling request) for an uplink grant that allocates resources for the UE 120 to use to transmit the BFR MAC-CE. In this case, the BFR MAC-CE may include an indication of the cause of the beam failure. In a case in which the beam failure is detected on a Pcell or SPcell, the UE 120 may perform a RACH procedure for BFR. In this case, in some aspects, the UE 120 may transmit, to the base station 110, a BFR MAC-CE including an indication of the cause of the beam failure on an uplink resource granted in the RACH procedure.

In some aspects, the indication of the cause of the beam failure may be included in a bit field of the BFR MAC-CE. In some aspects, the indication may be one of a first indication (e.g., a first bit value) associated with the first cause (e.g., degraded link quality) or a second indication (e.g., a second bit value) associated with the second cause (e.g., self-interference). In some aspects, the MAC-CE may include a bit field dedicated for indicating the cause of beam failure. For example, as shown in FIG. 8, a bit in an S bit field ($S_0$, $S_1$, . . . , $S_7$) may be used to indicate the cause of a beam failure on a respective component carrier (SP, $C_1$, . . . , $C_7$). In some aspects, the BFR MAC-CE may also include an indication of a candidate beam selected via candidate beam selection by the UE 120.

As further shown in FIG. 8, and by reference number 830, the base station 110 may transmit, to the UE 120, an indication of a new beam for the UE 120 and/or an indication for the UE 120 to fall back from the full-duplex mode to the half-duplex mode based at least in part on receiving the BFR MAC-CE including the indication of the cause of the beam failure. In some aspects, based at least in part on receiving an indication (e.g., the first indication) that the cause of the beam failure is the first cause (e.g., degraded link quality), the base station 110 may configure a new beam for the UE 120 without the UE 120 switching duplex modes. In this case, the base station 110 may transmit, to the UE 120, an indication of the new beam configured for the UE 120 without transmitting an indication for the UE 120 to fall back from the full-duplex mode to the half-duplex mode. The UE 120 may receive the indication of the new beam and switch beams for communicating with the base station 110.

In some aspects, based at least in part on receiving an indication (e.g., the second indication) that the cause of the beam failure is the second cause (e.g., self-interference), the base station 110 may transmit, to the UE 120, an indication to fall back from (e.g., switch from) the full-duplex mode to the half-duplex mode for slots configured for the full-duplex mode in order to avoid self-interference due to full-duplex communications. The UE 120 may receive the indication, and the UE 120 may switch from the full-duplex mode to the half-duplex mode. In this case, the base station 110 may schedule only downlink communications or only uplink communications in upcoming slots configured for the full-duplex mode. In some aspects, the base station 110 may transmit the indication to fall back from the full-duplex mode to the half-duplex mode without configuring a new beam for the UE 120. In some aspects, the base station 110 may transmit the indication to fall back from the full-duplex mode to the half-duplex mode, and the base station 110 may configure a new beam for the UE 120.

In some aspects, based at least in part on receiving an indication (e.g., the second indication) that the cause of the beam failure is the second cause (e.g., self-interference), the base station 110 may configure a new downlink/uplink beam for the UE 120 without the UE 120 switching duplex modes. For example, the base station 110 may configure a new uplink/downlink beam for the UE 120 to mitigate self-interference in the full-duplex mode. In this case, the base station 110 may transmit, to the UE 120, an indication of the new beam configured for the UE 120 without transmitting an indication for the UE 120 to fall back from the full-duplex mode to the half-duplex mode. The UE 120 may receive the indication of the new beam and switch beams for communicating with the base station 110.

In some aspects, the UE 120 may autonomously switch from the full-duplex mode to the half-duplex mode for slots configured for the full-duplex mode, based at least in part on detecting that the cause of the beam failure is the second cause (e.g., self-interference). In this case, transmitting the indication (e.g., the second indication), in the BFR MAC-CE, that the cause of the beam failure is the second cause (e.g., self-interference) may indicate, to the base station 110, that the UE 120 is switching from the full-duplex mode to the half-duplex mode. Alternatively, the UE 120 may transmit another indication to the base station 110, to indicate that the UE 120 is switching from the full-duplex mode to the half-duplex mode and/or to indicate whether to drop downlink communications or uplink communications from the upcoming slots configured for the full-duplex mode.

As described above in connection with FIG. 8, the UE 120 may receive, from the base station 110, a first BFD reference signal set in one or more slots in a full-duplex mode and a second BFD reference signal set in one or more slots in a half-duplex mode. The UE 120 may detect beam failure in the full-duplex mode based at least in part on the first BFD reference signal set, or the UE 120 may detect beam failure in the half-duplex mode based at least in part on the second BFD set. The UE 120 may detect a cause of the beam failure. For example, the UE 120 may detect a cause of beam failure in the full-duplex mode based at least in part on measurements of the first BFD reference signal set in the full-duplex mode and measurements of the second BFD reference signal set in the half-duplex mode. The UE 120 may transmit, to the base station 110 in a BFR MAC-CE, an indication of the cause of the beam failure. As a result, the base station 110 may determine whether to reconfigure the beam based at least in part on the cause of the beam failure. This may reduce unnecessary beam reconfigurations, which may increase network data rate and reliability and decrease latency of uplink and downlink traffic for the UE 120.

As indicated above, FIG. 8 is provided as an example. Other examples may differ from what is described with respect to FIG. 8.

FIG. 9 is a diagram illustrating an example process 900 performed, for example, by a UE, in accordance with the present disclosure. Example process 900 is an example where the UE (e.g., UE 120) performs operations associated with performing BFD in a full-duplex mode and a half-duplex mode. As shown in FIG. 9, the UE may independently perform BFD in the full-duplex mode (blocks 905-920) based on the first BFD reference signal set and in the half-duplex mode (blocks 925-940) based on the second BFD reference signal set.

In the full-duplex mode, an upper layer (e.g., the MAC layer) of the UE may receive, from a lower layer (e.g., the physical layer), a beam failure instance indication for a full-duplex resource (e.g., a resource associated with a reference signal in the first BFD reference signal set) (block 905). For example, the lower layer of the UE may perform measurements on the first BFD reference signal set received in full-duplex mode, and the lower layer of the UE may detect a beam failure instance in the full-duplex mode based at least in part on an RSRP measurement on the first BFD reference signal set failing to satisfy the first beam failure threshold configured for the full-duplex mode. The lower layer may send a beam failure instance indication to the upper layer in connection with detecting a beam failure instance in the full-duplex mode.

In connection with detecting a first beam failure instance (e.g., receiving a first beam failure indication from the lower layer) while in the full-duplex mode (e.g., after switching from the half-duplex mode), the UE may start or re-start the first BFD timer configured for the full-duplex mode (block 910), and the UE may increment the first beam failure instance counter for the full-duplex mode (BFI_COUNTER_FD) by one (block 915). The UE may determine whether the first beam failure instance counter (BFI_COUNTER_FD) satisfies (e.g., is greater than or equal to) a first threshold configured for the full-duplex model (e.g., the first beam failure instance counter threshold) (block 920). If BFI_COUNTER_FD does not satisfy the first threshold, the UE may continue to perform radio link monitoring of instances of the first BFD reference signal set, and the UE may increment BFI_COUNTER_FD by one (block 915) each time a beam failure instance is detected in the full-duplex mode. The UE may reset BFI_COUNTER_FD in a case in which the first BFD timer expires prior to the UE detecting beam failure in the full-duplex mode. If BFI_COUNTER_FD satisfies the first threshold, the UE may detect beam failure in the full-duplex mode.

In the half-duplex mode, the upper layer (e.g., the MAC layer) of the UE may receive, from the lower layer (e.g., the physical layer), a beam failure instance indication for a half-duplex resource (e.g., a resource associated with a reference signal in the first second reference signal set) (block 925). For example, the lower layer of the UE may perform measurements on the second BFD reference signal set received in half-duplex mode, and the lower layer of the UE may detect a beam failure instance in the half-duplex mode based at least in part on an RSRP measurement on the second BFD reference signal set failing to satisfy the second beam failure threshold configured for the half-duplex mode. The lower layer may send a beam failure instance indication to the upper layer in connection with detecting a beam failure instance in the half-duplex mode.

In connection with detecting a first beam failure instance (e.g., receiving a first beam failure indication from the lower layer) while in the half-duplex mode (e.g., after switching from the full-duplex mode), the UE may start or re-start the second BFD timer configured for the half-duplex mode (block 930), and the UE may increment the second beam failure instance counter for the half-duplex mode (BFI_COUNTER_HD) by one (block 935). The UE may determine whether the second beam failure instance counter (BFI_COUNTER_HD) satisfies (e.g., is greater than or equal to) a second threshold configured for the half-duplex model (e.g., the second beam failure instance counter threshold) (block 940). If BFI_COUNTER_HD does not satisfy the second threshold, the UE may continue to perform radio link monitoring of instances of the second BFD reference signal set, and the UE may increment BFI_COUNTER_HD by one (block 935) each time a beam failure instance is detected in the half-duplex mode. The UE may reset BFI_COUNTER_HD in a case in which the second BFD timer expires prior to the UE detecting beam failure in the half-duplex mode. If BFI_COUNTER_HD satisfies the first threshold, the UE may detect beam failure in the half-duplex mode.

In connection with detecting beam failure in the full-duplex mode (e.g., in block 920) or detecting beam failure in the half-duplex mode (e.g., in block 940), the UE may trigger BFR and report the beam failure with an indication of the cause of the beam failure. For example, the UE may detect the cause of the beam failure and transmit, to a base station, a BFR MAC-CE including an indication of the cause of the beam failure.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
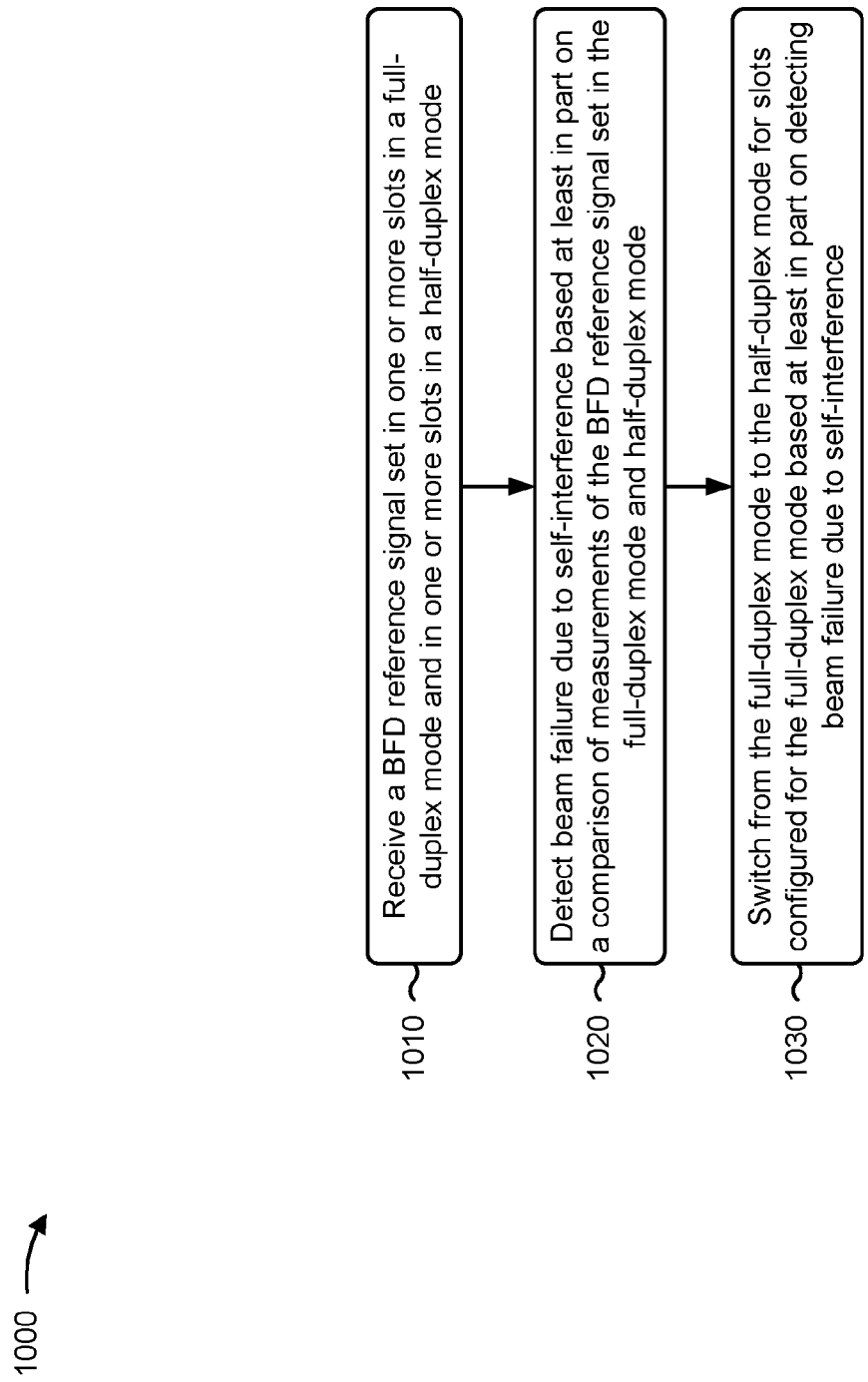
FIGS. 10-12 are diagrams illustrating example processes associated with BFD in full-duplex operation, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with BFD in full-duplex operation.

As shown in FIG. 10, in some aspects, process 1000 may include receiving, from a base station, a BFD reference signal set in one or more slots in a full-duplex mode and in one or more slots in a half-duplex mode (block 1010). For example, the UE (e.g., using reception component 1302, depicted in FIG. 13) may receive, from a base station, a BFD reference signal set in one or more slots in a full-duplex mode and in one or more slots in a half-duplex mode, as described above.

As further shown in FIG. 10, in some aspects, process 1000 may include detecting beam failure due to self-interference based at least in part on a comparison of measurements of the BFD reference signal set in the full-duplex mode and half-duplex mode (block 1020). For example, the UE (e.g., using detection component 1308, depicted in FIG. 13) may detect beam failure due to self-interference based at least in part on a comparison of measurements of the BFD reference signal set in the full-duplex mode and half-duplex mode, as described above.

As further shown in FIG. 10, in some aspects, process 1000 may include switching from the full-duplex mode to the half-duplex mode for slots configured for the full-duplex mode based at least in part on detecting beam failure due to self-interference (block 1030). For example, the UE (e.g., using switching component 1310, depicted in FIG. 13) may switch from the full-duplex mode to the half-duplex mode for slots configured for the full-duplex mode based at least in part on detecting beam failure due to self-interference, as described above.

Process 1000 may include additional aspects, such as any single aspect or any combination of aspects described below and/or in connection with one or more other processes described elsewhere herein.

In a first aspect, process 1000 includes receiving, from the base station, a BFD resource configuration that indicates BFD reference signal resources for the BFD reference signal set, and the BFD reference signal resources are configured with a same frequency domain resource allocation in the one or more slots in the full-duplex mode as a frequency domain resource allocation in the one or more slots in the half-duplex mode.

In a second aspect, alone or in combination with the first aspect, the BFD resource configuration further indicates a beam failure threshold, a beam failure instance counter threshold, a BFD timer duration associated with the beam failure instance counter, and BFR resources for requesting BFR.

In a third aspect, alone or in combination with one or more of the first and second aspects, detecting beam failure due to self-interference includes comparing a first beam measurement performed on the BFD reference signal set in the full-duplex mode and a second beam measurement performed on the BFD reference signal set in the half-duplex mode, and detecting whether the beam failure is due to self-interference based at least in part on a determination of whether a difference between the first beam measurement and the second beam measurement satisfies a threshold.

In a fourth aspect, alone or in combination with one or more of the first through third aspects, the first beam measurement is a first SINR measurement and the second beam measurement is a second SINR measurement.

In a fifth aspect, alone or in combination with one or more of the first through fourth aspects, process 1000 includes transmitting, to the base station and based at least in part on switching from the full-duplex mode to the half-duplex mode, a message including an indication that the UE has switched from the full-duplex mode to the half-duplex mode.

In a sixth aspect, alone or in combination with one or more of the first through fifth aspects, the message further includes an indication of whether to drop uplink communications or downlink communications from the slots configured for the full-duplex mode.

In a seventh aspect, alone or in combination with one or more of the first through sixth aspects, process 1000 includes receiving, from the base station and based at least in part on transmitting the message, an indication of a new beam configured for the UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
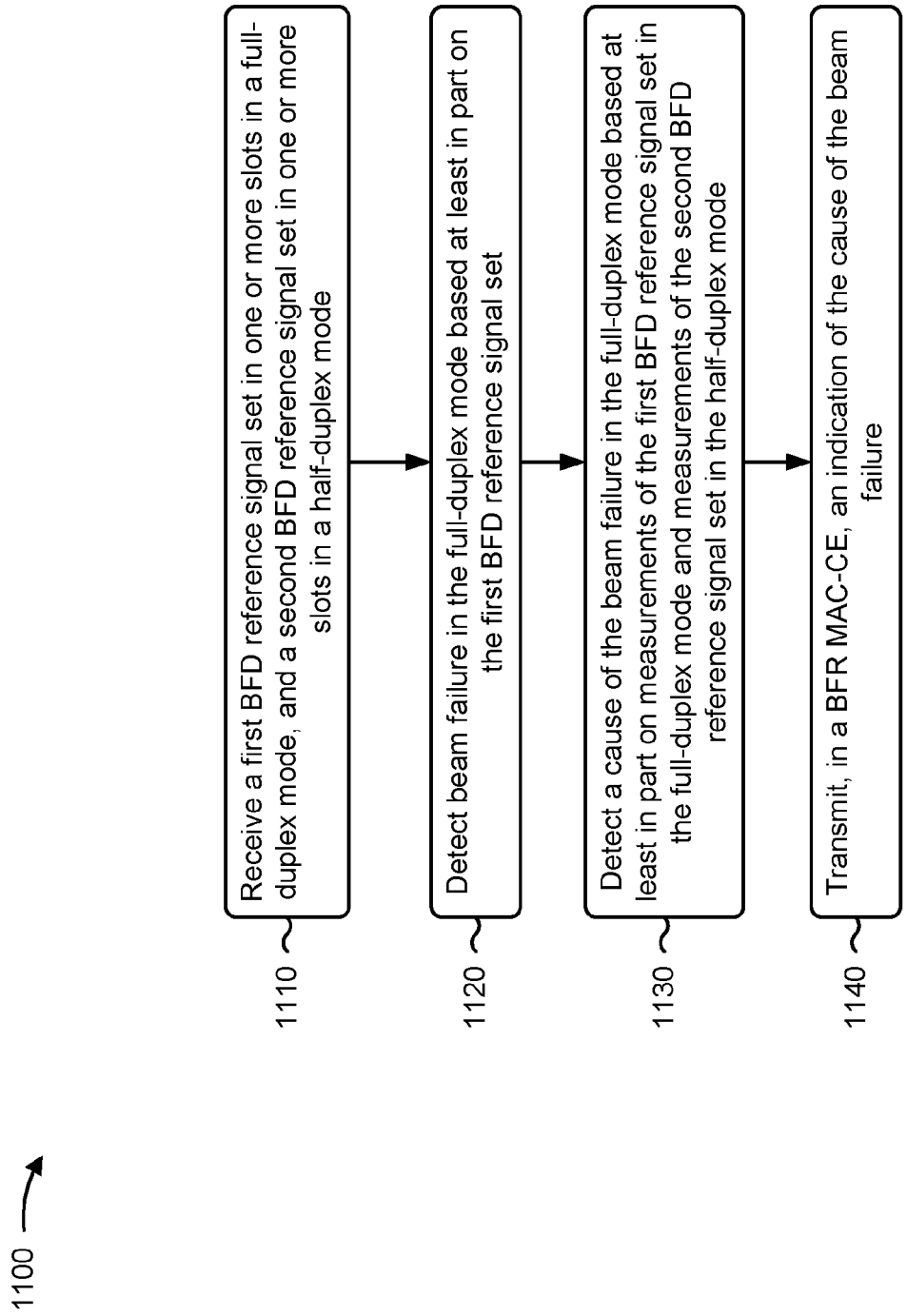

FIG. 11 is a diagram illustrating an example process 1100 performed, for example, by a UE, in accordance with the present disclosure. Example process 1100 is an example where the UE (e.g., UE 120) performs operations associated with BFD in full-duplex operation.

As shown in FIG. 11, in some aspects, process 1100 may include receiving, from a base station, a first BFD reference signal set in one or more slots in a full-duplex mode, and a second BFD reference signal set in one or more slots in a half-duplex mode (block 1110). For example, the UE (e.g., using reception component 1302, depicted in FIG. 13) may receive, from a base station, a first BFD reference signal set in one or more slots in a full-duplex mode, and a second BFD reference signal set in one or more slots in a half-duplex mode, as described above.

As further shown in FIG. 11, in some aspects, process 1100 may include detecting beam failure in the full-duplex mode based at least in part on the first BFD reference signal set (block 1120). For example, the UE (e.g., using detection component 1308, depicted in FIG. 13) may detect beam failure in the full-duplex mode based at least in part on the first BFD reference signal set, as described above.

As further shown in FIG. 11, in some aspects, process 1100 may include detecting a cause of the beam failure in the full-duplex mode based at least in part on measurements of the first BFD reference signal set in the full-duplex mode and measurements of the second BFD reference signal set in the half-duplex mode (block 1130). For example, the UE (e.g., using detection component 1308, depicted in FIG. 13) may detect a cause of the beam failure in the full-duplex mode based at least in part on measurements of the first BFD reference signal set in the full-duplex mode and measurements of the second BFD reference signal set in the half-duplex mode, as described above.

As further shown in FIG. 11, in some aspects, process 1100 may include transmitting, to the base station in a BFR MAC-CE, an indication of the cause of the beam failure (block 1140). For example, the UE (e.g., using transmission component 1304, depicted in FIG. 13) may transmit, to the base station in a BFR MAC-CE, an indication of the cause of the beam failure, as described above.

Process 1100 may include additional aspects, such as any single aspect or any combination of aspects described below and/or in connection with one or more other processes described elsewhere herein.

In a first aspect, process 1100 includes detecting beam failure instances in the full-duplex mode based at least in part on the first BFD reference signal set, and incrementing a first beam failure instance counter for each beam failure instance detected in the full-duplex mode, wherein detecting beam failure in the full-duplex mode is based at least in part on the first beam failure instance counter satisfying a first threshold within a first BFD timer duration.

In a second aspect, alone or in combination with the first aspect, process 1000 includes detecting beam failure instances in the half-duplex mode based at least in part on the second BFD reference signal set, incrementing a second beam failure instance counter for each beam failure instance detected in the half-duplex mode, and detecting beam failure in the half-duplex mode based at least in part on the second beam failure instance counter satisfying a second threshold within a second BFD timer duration.

In a third aspect, alone or in combination with one or more of the first and second aspects, detecting the cause of the beam failure in the full-duplex mode includes detecting, based at least in part on the measurements of the first BFD reference signal set in the full-duplex mode and the measurements of the second BFD reference signal set in the half-duplex mode, that the cause of the beam failure in the full-duplex mode is one of a first cause associated with degraded link quality or a second cause associated with self-interference.

In a fourth aspect, alone or in combination with one or more of the first through third aspects, the indication is one of a first indication associated with the first cause or a second indication associated with the second cause, and the indication is included in a bit field in the BFR MAC-CE.

In a fifth aspect, alone or in combination with one or more of the first through fourth aspects, process 1100 includes receiving, from the base station and based at least in part on transmitting the first indication in the BFR MAC-CE, an indication of a new beam configured for the UE.

In a sixth aspect, alone or in combination with one or more of the first through fifth aspects, process 1100 includes receiving, from the base station and based at least in part on transmitting the second indication in the BFR MAC-CE, an indication for the UE to switch from the full-duplex mode to the half-duplex mode for slots configured for the full-duplex mode.

In a seventh aspect, alone or in combination with one or more of the first through sixth aspects, process 1100 includes receiving, from the base station and based at least in part on transmitting the second indication in the BFR MAC-CE, an indication of a new beam configured for the UE for communications with the base station in the full-duplex mode.

In an eighth aspect, alone or in combination with one or more of the first through seventh aspects, process 1100 includes switching, based at least in part on detecting that the cause of the beam failure in the full-duplex mode is the second cause, from the full-duplex mode to the half-duplex mode for slots configured for the full-duplex mode, wherein transmitting the second indication in the BFR MAC-CE indicates, to the base station, that the UE is switching from the full-duplex mode to the half-duplex mode.

In a ninth aspect, alone or in combination with one or more of the first through eighth aspects, the first BFD reference signal set includes a first reference signal subset having a same frequency domain resource allocation as a frequency domain resource allocation of the second BFD reference signal set, and a second reference signal subset having a different frequency domain resource allocation as the frequency domain resource allocation of the second BFD reference signal set, and detecting the cause of the beam failure in the full-duplex mode is based at least in part on a comparison of a first beam measurement on the first reference signal subset of the first BFD reference signal set and a second beam measurement on the second BFD reference signal set.

In a tenth aspect, alone or in combination with one or more of the first through ninth aspects, process 1100 includes receiving, from the base station, a first BFD resource configuration for the full-duplex mode and a second BFD resource configuration for the half-duplex mode, the first BFD resource configuration indicates first BFD reference signal resources for the first BFD reference signal set, and the second BFD resource configuration indicates second BFD reference signal resources for the second BFD reference signal set.

In an eleventh aspect, alone or in combination with one or more of the first through tenth aspects, the first BFD resource configuration indicates a first beam failure threshold, a first beam failure instance counter threshold, a first BFD timer duration associated, and first BFR resources for requesting BFR in the full-duplex mode, and the second BFD resource configuration indicates a second beam failure threshold, a second beam failure instance counter threshold, a second BFD timer duration, and second BFR resources for requesting BFR in the half-duplex mode.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
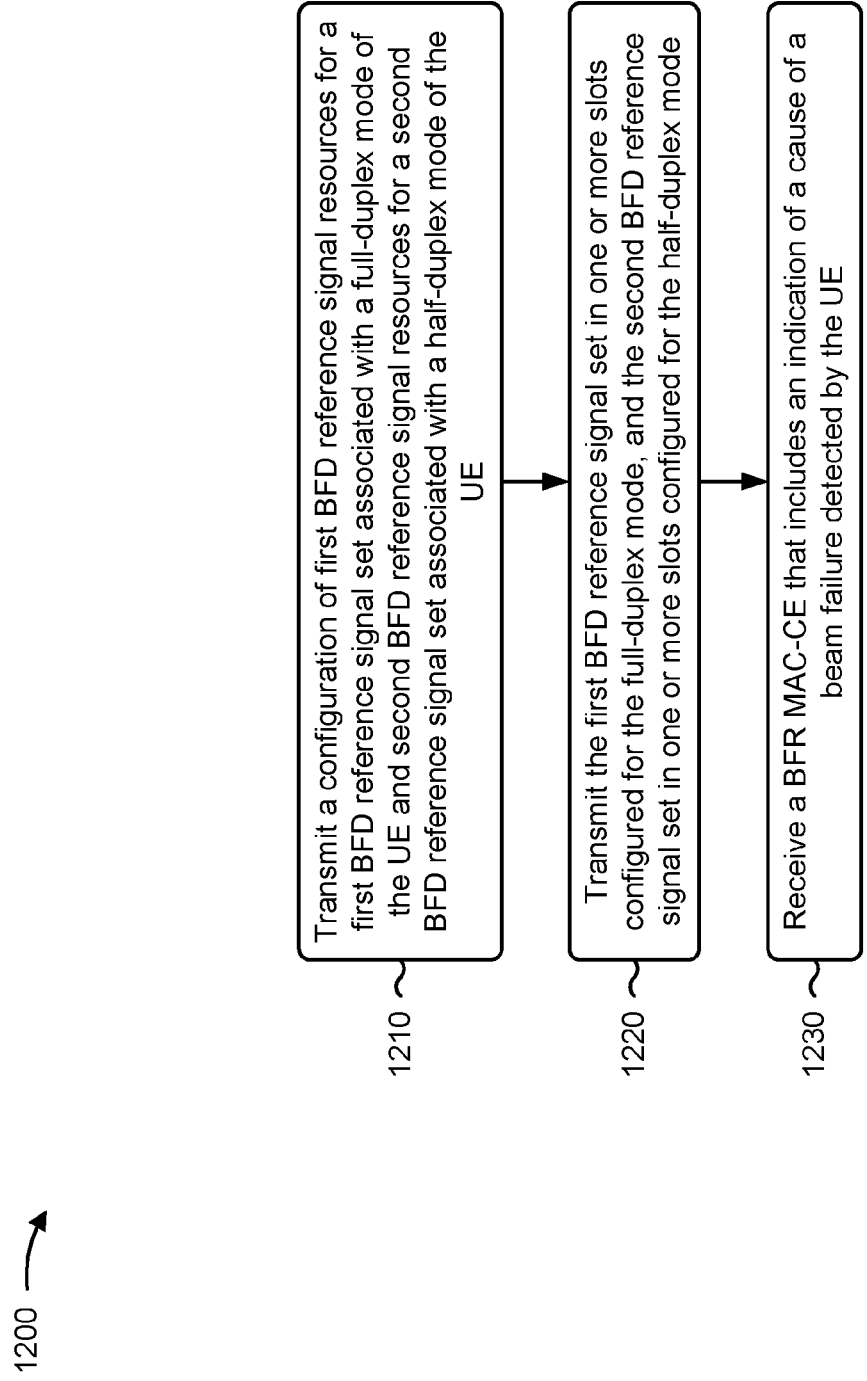

FIG. 12 is a diagram illustrating an example process 1200 performed, for example, by a base station, in accordance with the present disclosure. Example process 1200 is an example where the base station (e.g., base station 110) performs operations associated with BFD in full-duplex operation.

As shown in FIG. 12, in some aspects, process 1200 may include transmitting, to a UE, a first BFD resource configuration for a full-duplex mode of the UE and a second BFD resource configuration for a half-duplex mode of the UE, wherein the first BFD resource configuration includes a first BFD reference signal resources for a first BFD reference signal set associated with the full-duplex mode of the UE and the second BFD resource configuration includes second BFD reference signal resources for a second BFD reference signal set associated with the half-duplex mode of the UE (block 1210). For example, the base station (e.g., using transmission component 1404, depicted in FIG. 14) may transmit, to a UE, a first BFD resource configuration for a full-duplex mode of the UE and a second BFD resource configuration for a half-duplex mode of the UE, wherein the first BFD resource configuration includes a first BFD reference signal resources for a first BFD reference signal set associated with the full-duplex mode of the UE and the second BFD resource configuration includes second BFD reference signal resources for a second BFD reference signal set associated with the half-duplex mode of the UE, as described above.

As further shown in FIG. 12, in some aspects, process 1200 may include transmitting, to the UE, the first BFD reference signal set in one or more slots configured for the full-duplex mode, and the second BFD reference signal set in one or more slots configured for the half-duplex mode (block 1220). For example, the base station (e.g., using transmission component 1404, depicted in FIG. 14) may transmit, to the UE, the first BFD reference signal set in one or more slots configured for the full-duplex mode, and the second BFD reference signal set in one or more slots configured for the half-duplex mode, as described above.

As further shown in FIG. 12, in some aspects, process 1200 may include receiving, from the UE, a BFR MAC-CE that includes an indication of a cause of a beam failure detected by the UE (block 1230). For example, the base station (e.g., using reception component 1402, depicted in FIG. 14) may receive, from the UE, a BFR MAC-CE that includes an indication of a cause of a beam failure detected by the UE, as described above.

Process 1200 may include additional aspects, such as any single aspect or any combination of aspects described below and/or in connection with one or more other processes described elsewhere herein.

In a first aspect, the indication indicates one of a first cause associated with degraded link quality or a second cause associated with self-interference.

In a second aspect, alone or in combination with the first aspect, the indication is one of a first indication associated with the first cause or a second indication associated with the second cause, and the indication is included in a bit field in the BFR MAC-CE.

In a third aspect, alone or in combination with one or more of the first and second aspects, process 1200 includes transmitting, to the UE and based at least in part on receiving the first indication in the BFR MAC-CE, an indication of a new beam configured for the UE.

In a fourth aspect, alone or in combination with one or more of the first through third aspects, process 1200 includes transmitting, to the UE and based at least in part on receiving the second indication in the BFR MAC-CE, an indication for the UE to switch from the full-duplex mode to the half-duplex mode for slots configured for the full-duplex mode.

In a fifth aspect, alone or in combination with one or more of the first through fourth aspects, process 1200 includes transmitting, to the UE and based at least in part on receiving the second indication in the BFR MAC-CE, an indication of a new beam configured for the UE for communications with the base station in the full-duplex mode.

In a sixth aspect, alone or in combination with one or more of the first through fifth aspects, the first BFD reference signal set includes a first reference signal subset having a same frequency domain resource allocation as a frequency domain resource allocation of the second BFD reference signal set, and a second reference signal subset having a different frequency domain resource allocation as the frequency domain resource allocation of the second BFD reference signal set.

In a seventh aspect, alone or in combination with one or more of the first through sixth aspects, the first BFD resource configuration indicates a first threshold associated with a first beam failure instance counter, a first BFD timer duration associated with the first beam failure instance counter, and first BFR resources for requesting BFR in the full-duplex mode, and the second BFD resource configuration indicates a second threshold associated with a second beam failure instance counter, a second BFD timer duration associated with the second beam failure instance counter, and second BFR resources for requesting BFR in the half-duplex mode.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
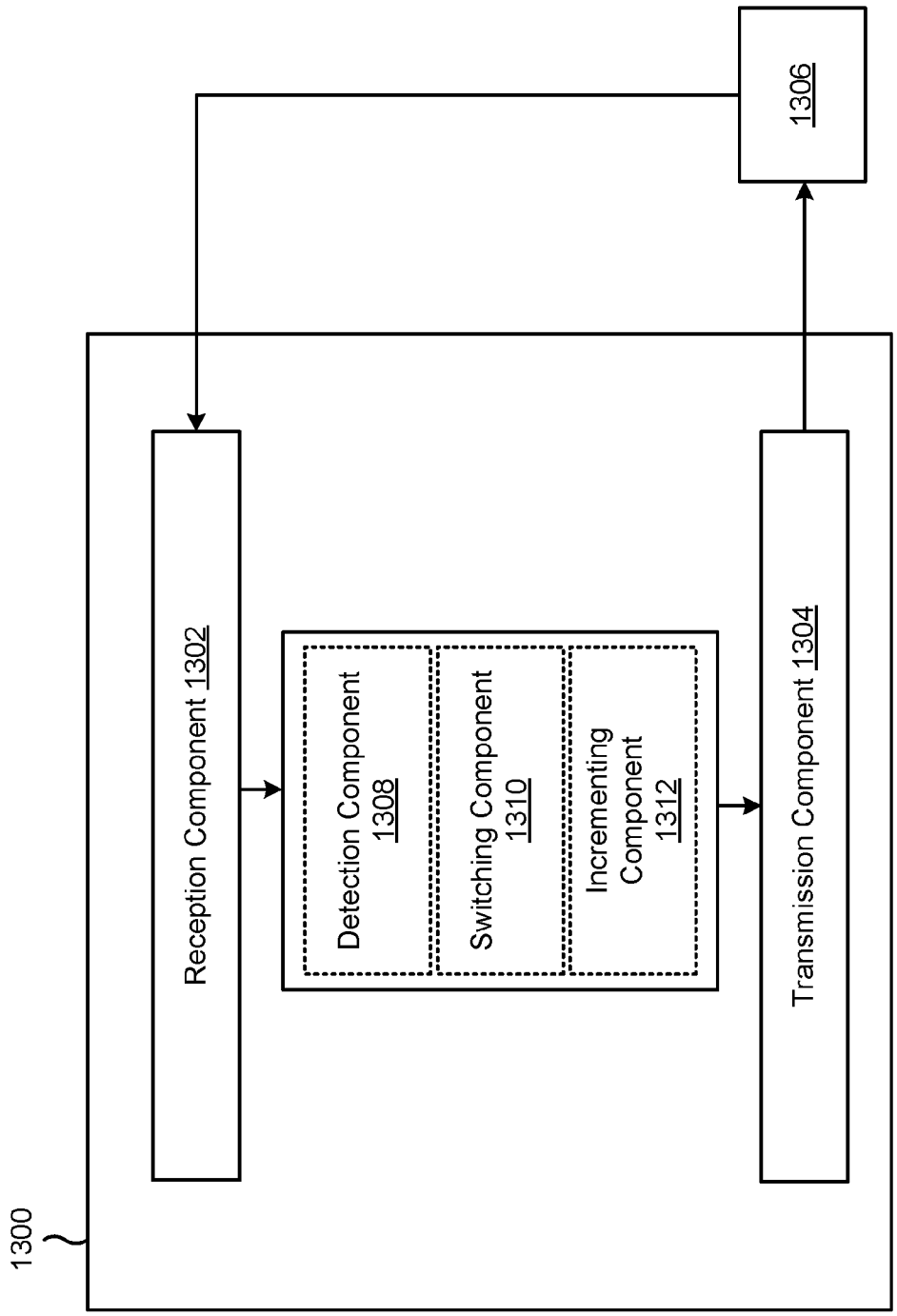
FIGS. 13-14 are block diagrams of example apparatuses for wireless communication, in accordance with the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of a detection component 1308, a switching component 1310, or an incrementing component 1312, among other examples.

In some aspects, the apparatus 1300 may be configured to perform one or more operations described herein in connection with FIGS. 7-8. Additionally, or alternatively, the apparatus 1200 may be configured to perform one or more processes described herein, such as process 900 of FIG. 9, process 1000 of FIG. 10, process 1100 of FIG. 11, or a combination thereof. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The reception component 1302 may receive, from a base station, a BFD reference signal set in one or more slots in a full-duplex mode and in one or more slots in a half-duplex mode. The detection component 1308 may detect beam failure due to self-interference based at least in part on a comparison of measurements of the BFD reference signal set in the full-duplex mode and half-duplex mode. The switching component 1310 may switch from the full-duplex mode to the half-duplex mode for slots configured for the full-duplex mode based at least in part on detecting beam failure due to self-interference.

The reception component 1302 may receive, from the base station, a BFD resource configuration that indicates BFD reference signal resources for the BFD reference signal set, wherein the BFD reference signal resources are configured with a same frequency domain resource allocation in the one or more slots in the full-duplex mode as a frequency domain resource allocation in the one or more slots in the half-duplex mode.

The transmission component 1304 may transmit, to the base station and based at least in part on switching from the full-duplex mode to the half-duplex mode, a message including an indication that the UE has switched from the full-duplex mode to the half-duplex mode.

The reception component 1302 may receive, from the base station and based at least in part on transmitting the message, an indication of a new beam configured for the UE.

The reception component 1302 may receive, from a base station, a first BFD reference signal set in one or more slots in a full-duplex mode, and a second BFD reference signal set in one or more slots in a half-duplex mode. The detection component 1308 may detect beam failure in the full-duplex mode based at least in part on the first BFD reference signal set. The detection component 1308 may detect a cause of the beam failure in the full-duplex mode based at least in part on measurements of the first BFD reference signal set in the full-duplex mode and measurements of the second BFD reference signal set in the half-duplex mode. The transmission component 1304 may transmit, to the base station in a BFR MAC-CE, an indication of the cause of the beam failure.

The detection component 1308 may detect beam failure instances in the full-duplex mode based at least in part on the first BFD reference signal set.

The incrementing component 1312 may increment a first beam failure instance counter for each beam failure instance detected in the full-duplex mode, wherein detecting beam failure in the full-duplex mode is based at least in part on the first beam failure instance counter satisfying a first threshold within a first BFD timer duration.

The detection component 1308 may detect beam failure instances in the half-duplex mode based at least in part on the second BFD reference signal set.

The incrementing component 1312 may increment a second beam failure instance counter for each beam failure instance detected in the half-duplex mode.

The detection component 1308 may detect beam failure in the half-duplex mode based at least in part on the second beam failure instance counter satisfying a second threshold within a second BFD timer duration.

The reception component 1302 may receive, from the base station and based at least in part on transmitting the first indication in the BFR MAC-CE, an indication of a new beam configured for the UE.

The reception component 1302 may receive, from the base station and based at least in part on transmitting the second indication in the BFR MAC-CE, an indication for the UE to switch from the full-duplex mode to the half-duplex mode for slots configured for the full-duplex mode.

The reception component 1302 may receive, from the base station and based at least in part on transmitting the second indication in the BFR MAC-CE, an indication of a new beam configured for the UE for communications with the base station in the full-duplex mode.

The switching component 1310 may switch, based at least in part on detecting that the cause of the beam failure in the full-duplex mode is the second cause, from the full-duplex mode to the half-duplex mode for slots configured for the full-duplex mode wherein transmitting the second indication in the BFR MAC-CE indicates, to the base station, that the UE is switching from the full-duplex mode to the half-duplex mode.

The reception component 1302 may receive, from the base station, a first BFD resource configuration for the full-duplex mode and a second BFD resource configuration for the half-duplex mode, wherein the first BFD resource configuration indicates first BFD reference signal resources for the first BFD reference signal set, and the second BFD resource configuration indicates second BFD reference signal resources for the second BFD reference signal set.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
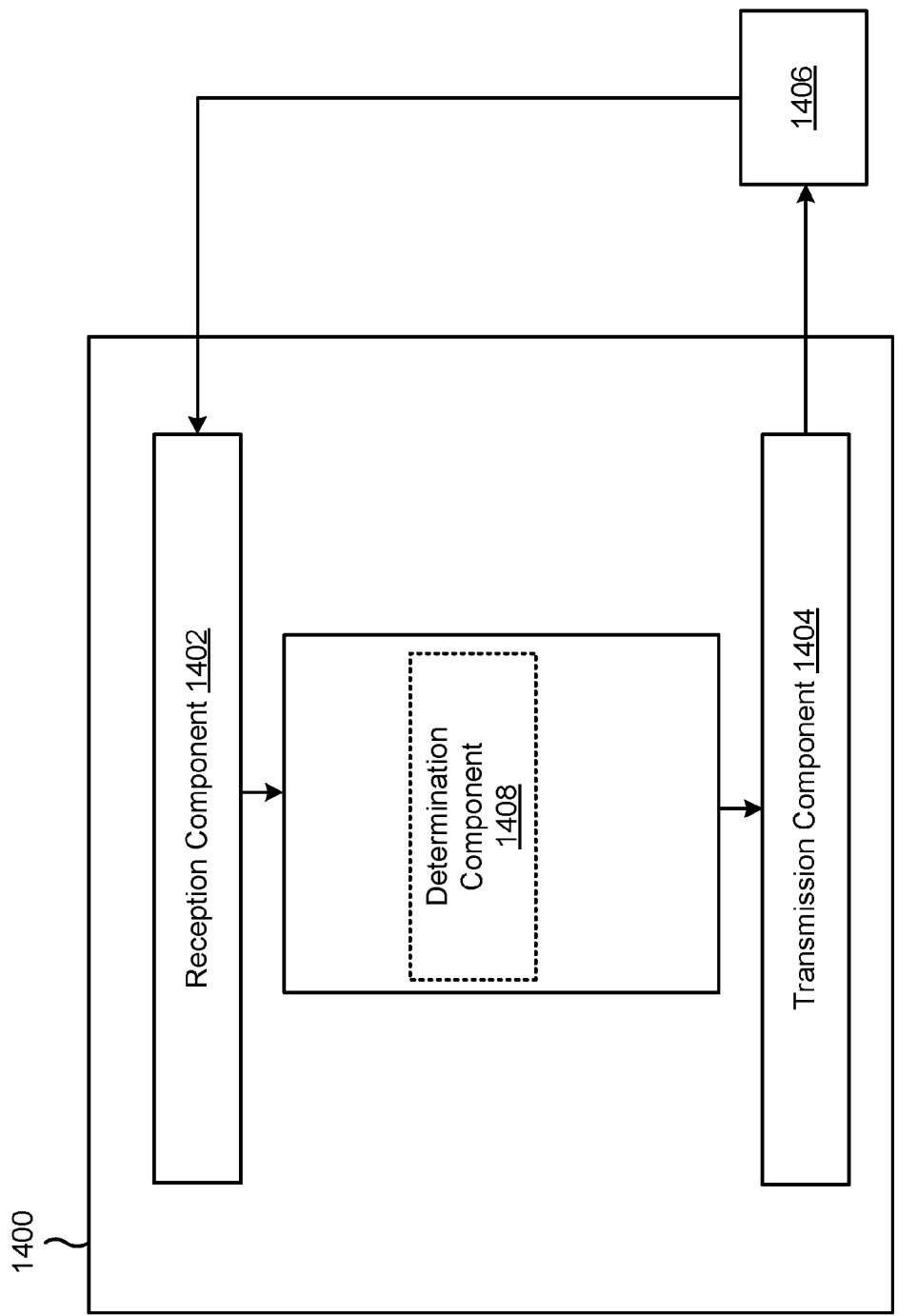

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a determination component 1408, among other examples.

In some aspects, the apparatus 1400 may be configured to perform one or more operations described herein in connection with FIGS. 7-8. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The transmission component 1404 may transmit, to a UE, a first BFD resource configuration for a full-duplex mode of the UE and a second BFD resource configuration for a half-duplex mode of the UE, wherein the first BFD resource configuration includes a first BFD reference signal resources for a first BFD reference signal set associated with the full-duplex mode of the UE and the second BFD resource configuration includes second BFD reference signal resources for a second BFD reference signal set associated with the half-duplex mode of the UE. The transmission component 1404 may transmit, to the UE, the first BFD reference signal set in one or more slots configured for the full-duplex mode, and the second BFD reference signal set in one or more slots configured for the half-duplex mode. The reception component 1402 may receive, from the UE, a BFR MAC-CE that includes an indication of a cause of a beam failure detected by the UE. The determination component 1408 may determine the first BFD resource configuration and the second BFD resource configuration.

The transmission component 1404 may transmit, to the UE and based at least in part on receiving the first indication in the BFR MAC-CE, an indication of a new beam configured for the UE.

The transmission component 1404 may transmit, to the UE and based at least in part on receiving the second indication in the BFR MAC-CE, an indication for the UE to switch from the full-duplex mode to the half-duplex mode for slots configured for the full-duplex mode.

The transmission component 1404 may transmit, to the UE and based at least in part on receiving the second indication in the BFR MAC-CE, an indication of a new beam configured for the UE for communications with the base station in the full-duplex mode.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving, from a base station, a beam failure detection (BFD) reference signal set in one or more slots in a full-duplex mode and in one or more slots in a half-duplex mode; detecting beam failure due to self-interference based at least in part on a comparison of measurements of the BFD reference signal set in the full-duplex mode and half-duplex mode; and switching from the full-duplex mode to the half-duplex mode for slots configured for the full-duplex mode based at least in part on detecting beam failure due to self-interference.

Aspect 2: The method of Aspect 1, further comprising: receiving, from the base station, a BFD resource configuration that indicates BFD reference signal resources for the BFD reference signal set, wherein the BFD reference signal resources are configured with a same frequency domain resource allocation in the one or more slots in the full-duplex mode as a frequency domain resource allocation in the one or more slots in the half-duplex mode.

Aspect 3: The method of Aspect 2, wherein the BFD resource configuration further indicates a beam failure threshold, a beam failure instance counter threshold, a BFD timer duration associated with the beam failure instance counter, and BFR resources for requesting BFR.

Aspect 4: The method of any of Aspects 1-3, wherein detecting beam failure due to self-interference comprises: comparing a first beam measurement performed on the BFD reference signal set in the full-duplex mode and a second beam measurement performed on the BFD reference signal set in the half-duplex mode; and detecting whether the beam failure is due to self-interference based at least in part on a determination of whether a difference between the first beam measurement and the second beam measurement satisfies a threshold.

Aspect 5: The method of Aspect 4, wherein the first beam measurement is a first signal-to-interference-plus-noise ratio (SINR) measurement and the second beam measurement is a second SINR measurement.

Aspect 6: The method of any of Aspects 1-5, further comprising: transmitting, to the base station and based at least in part on switching from the full-duplex mode to the half-duplex mode, a message including an indication that the UE has switched from the full-duplex mode to the half-duplex mode.

Aspect 7: The method of Aspect 6, wherein the message further includes an indication of whether to drop uplink communications or downlink communications from the slots configured for the full-duplex mode.

Aspect 8: The method of any of Aspects 6-7, further comprising: receiving, from the base station and based at least in part on transmitting the message, an indication of a new beam configured for the UE.

Aspect 9: A method of wireless communication performed by a user equipment (UE), comprising: receiving, from a base station, a first beam failure detection (BFD) reference signal set in one or more slots in a full-duplex mode, and a second BFD reference signal set in one or more slots in a half-duplex mode; detecting beam failure in the full-duplex mode based at least in part on the first BFD reference signal set; detecting a cause of the beam failure in the full-duplex mode based at least in part on measurements of the first BFD reference signal set in the full-duplex mode and measurements of the second BFD reference signal set in the half-duplex mode; and transmitting, to the base station in a beam failure recovery (BFR) medium access control (MAC) control element (MAC-CE), an indication of the cause of the beam failure.

Aspect 10: The method of Aspect 9, further comprising: detecting beam failure instances in the full-duplex mode based at least in part on the first BFD reference signal set; and incrementing a first beam failure instance counter for each beam failure instance detected in the full-duplex mode, wherein detecting beam failure in the full-duplex mode is based at least in part on the first beam failure instance counter satisfying a first threshold within a first BFD timer duration.

Aspect 11: The method of any of Aspects 9-10, further comprising: detecting beam failure instances in the half-duplex mode based at least in part on the second BFD reference signal set; incrementing a second beam failure instance counter for each beam failure instance detected in the half-duplex mode; and detecting beam failure in the half-duplex mode based at least in part on the second beam failure instance counter satisfying a second threshold within a second BFD timer duration.

Aspect 12: The method of any of Aspects 9-11, wherein detecting the cause of the beam failure in the full-duplex mode comprises: detecting, based at least in part on the measurements of the first BFD reference signal set in the full-duplex mode and the measurements of the second BFD reference signal set in the half-duplex mode, that the cause of the beam failure in the full-duplex mode is one of a first cause associated with degraded link quality or a second cause associated with self-interference.

Aspect 13: The method of Aspect 12, wherein the indication is one of a first indication associated with the first cause or a second indication associated with the second cause, and wherein the indication is included in a bit field in the BFR MAC-CE.

Aspect 14: The method of Aspect 13, further comprising: receiving, from the base station and based at least in part on transmitting the first indication in the BFR MAC-CE, an indication of a new beam configured for the UE.

Aspect 15: The method of Aspect 13, further comprising: receiving, from the base station and based at least in part on transmitting the second indication in the BFR MAC-CE, an indication for the UE to switch from the full-duplex mode to the half-duplex mode for slots configured for the full-duplex mode.

Aspect 16: The method of Aspect 13, further comprising: receiving, from the base station and based at least in part on transmitting the second indication in the BFR MAC-CE, an indication of a new beam configured for the UE for communications with the base station in the full-duplex mode.

Aspect 17: The method of Aspect 13, further comprising: switching, based at least in part on detecting that the cause of the beam failure in the full-duplex mode is the second cause, from the full-duplex mode to the half-duplex mode for slots configured for the full-duplex mode, wherein transmitting the second indication in the BFR MAC-CE indicates, to the base station, that the UE is switching from the full-duplex mode to the half-duplex mode.

Aspect 18: The method of any of Aspects 9-17, wherein the first BFD reference signal set includes a first reference signal subset having a same frequency domain resource allocation as a frequency domain resource allocation of the second BFD reference signal set, and a second reference signal subset having a different frequency domain resource allocation as the frequency domain resource allocation of the second BFD reference signal set, and wherein detecting the cause of the beam failure in the full-duplex mode is based at least in part on a comparison of a first beam measurement on the first reference signal subset of the first BFD reference signal set and a second beam measurement on the second BFD reference signal set.

Aspect 19: The method of any of Aspects 9-18, further comprising: receiving, from the base station, a first BFD resource configuration for the full-duplex mode and a second BFD resource configuration for the half-duplex mode, wherein the first BFD resource configuration indicates first BFD reference signal resources for the first BFD reference signal set, and the second BFD resource configuration indicates second BFD reference signal resources for the second BFD reference signal set.

Aspect 20: The method of Aspect 19, wherein the first BFD resource configuration indicates a first beam failure threshold, a first beam failure instance counter threshold, a first BFD timer duration associated, and first BFR resources for requesting BFR in the full-duplex mode, and the second BFD resource configuration indicates a second beam failure threshold, a second beam failure instance counter threshold, a second BFD timer duration, and second BFR resources for requesting BFR in the half-duplex mode.

Aspect 21: A method of wireless communication performed by a base station, comprising: transmitting, to a user equipment (UE), a first beam failure detection (BFD) resource configuration for a full-duplex mode of the UE and a second BFD resource configuration for a half-duplex mode of the UE, wherein the first BFD resource configuration includes a first BFD reference signal resources for a first BFD reference signal set associated with the full-duplex mode of the UE and the second BFD resource configuration includes second BFD reference signal resources for a second BFD reference signal set associated with the half-duplex mode of the UE; transmitting, to the UE, the first BFD reference signal set in one or more slots configured for the full-duplex mode, and the second BFD reference signal set in one or more slots configured for the half-duplex mode; and receiving, from the UE, a beam failure recovery (BFR) medium access control (MAC) control element (MAC-CE) that includes an indication of a cause of a beam failure detected by the UE.

Aspect 22: The method of Aspect 21, wherein the indication indicates one of a first cause associated with degraded link quality or a second cause associated with self-interference.

Aspect 23: The method of Aspect 22, wherein the indication is one of a first indication associated with the first cause or a second indication associated with the second cause, and wherein the indication is included in a bit field in the BFR MAC-CE.

Aspect 24: The method of Aspect 23, further comprising: transmitting, to the UE and based at least in part on receiving the first indication in the BFR MAC-CE, an indication of a new beam configured for the UE.

Aspect 25: The method of Aspect 23, further comprising: transmitting, to the UE and based at least in part on receiving the second indication in the BFR MAC-CE, an indication for the UE to switch from the full-duplex mode to the half-duplex mode for slots configured for the full-duplex mode.

Aspect 26: The method of Aspect 23, further comprising: transmitting, to the UE and based at least in part on receiving the second indication in the BFR MAC-CE, an indication of a new beam configured for the UE for communications with the base station in the full-duplex mode.

Aspect 27: The method of any of Aspects 21-26, wherein the first BFD reference signal set includes a first reference signal subset having a same frequency domain resource allocation as a frequency domain resource allocation of the second BFD reference signal set, and a second reference signal subset having a different frequency domain resource allocation as the frequency domain resource allocation of the second BFD reference signal set.

Aspect 28: The method of any of Aspects 21-27, wherein the first BFD resource configuration indicates a first threshold associated with a first beam failure instance counter, a first BFD timer duration associated with the first beam failure instance counter, and first BFR resources for requesting BFR in the full-duplex mode, and the second BFD resource configuration indicates a second threshold associated with a second beam failure instance counter, a second BFD timer duration associated with the second beam failure instance counter, and second BFR resources for requesting BFR in the half-duplex mode.

Aspect 29: An apparatus for wireless communication at a device, comprising a processor; memory coupled with the processor; and instructions stored in the memory and executable by the processor to cause the apparatus to perform the method of one or more of Aspects 1-8.

Aspect 30: An apparatus for wireless communication at a device, comprising a processor; memory coupled with the processor; and instructions stored in the memory and executable by the processor to cause the apparatus to perform the method of one or more of Aspects 9-20.

Aspect 31: An apparatus for wireless communication at a device, comprising a processor; memory coupled with the processor; and instructions stored in the memory and executable by the processor to cause the apparatus to perform the method of one or more of Aspects 21-28.

Aspect 32: A device for wireless communication, comprising a memory and one or more processors coupled to the memory, the memory and the one or more processors configured to perform the method of one or more of Aspects 1-8.

Aspect 33: A device for wireless communication, comprising a memory and one or more processors coupled to the memory, the memory and the one or more processors configured to perform the method of one or more of Aspects 9-20.

Aspect 34: A device for wireless communication, comprising a memory and one or more processors coupled to the memory, the memory and the one or more processors configured to perform the method of one or more of Aspects 21-28.

Aspect 35: An apparatus for wireless communication, comprising at least one means for performing the method of one or more of Aspects 1-8.

Aspect 36: An apparatus for wireless communication, comprising at least one means for performing the method of one or more of Aspects 9-20.

Aspect 37: An apparatus for wireless communication, comprising at least one means for performing the method of one or more of Aspects 21-28.

Aspect 38: A non-transitory computer-readable medium storing code for wireless communication, the code comprising instructions executable by a processor to perform the method of one or more of Aspects 1-8.

Aspect 39: A non-transitory computer-readable medium storing code for wireless communication, the code comprising instructions executable by a processor to perform the method of one or more of Aspects 9-20.

Aspect 40: A non-transitory computer-readable medium storing code for wireless communication, the code comprising instructions executable by a processor to perform the method of one or more of Aspects 21-28.

Aspect 41: A non-transitory computer-readable medium storing a set of instructions for wireless communication, the set of instructions comprising one or more instructions that, when executed by one or more processors of a device, cause the device to perform the method of one or more of Aspects 1-8.

Aspect 42: A non-transitory computer-readable medium storing a set of instructions for wireless communication, the set of instructions comprising one or more instructions that, when executed by one or more processors of a device, cause the device to perform the method of one or more of Aspects 9-20.

Aspect 43: A non-transitory computer-readable medium storing a set of instructions for wireless communication, the set of instructions comprising one or more instructions that, when executed by one or more processors of a device, cause the device to perform the method of one or more of Aspects 21-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
 a memory; and
 one or more processors, coupled to the memory, configured to:
  receive, from a base station, a beam failure detection (BFD) reference signal set in one or more slots in a full-duplex mode and in one or more slots in a half-duplex mode;
  detect beam failure due to self-interference based at least in part on a comparison of measurements of the BFD reference signal set in the full-duplex mode and half-duplex mode; and
  switch from the full-duplex mode to the half-duplex mode for slots configured for the full-duplex mode based at least in part on detecting beam failure due to self-interference.

2. The UE of claim 1, wherein the one or more processors are further configured to:
 receive, from the base station, a BFD resource configuration that indicates BFD reference signal resources for the BFD reference signal set, wherein the BFD reference signal resources are configured with a same frequency domain resource allocation in the one or more slots in the full-duplex mode as a frequency domain resource allocation in the one or more slots in the half-duplex mode.

3. The UE of claim 2, wherein the BFD resource configuration further indicates a beam failure threshold, a beam failure instance counter threshold, a BFD timer duration associated with the beam failure instance counter, and BFR resources for requesting BFR.

4. The UE of claim 1, wherein the one or more processors, to detect beam failure due to self-interference, are configured to:
 compare a first beam measurement performed on the BFD reference signal set in the full-duplex mode and a second beam measurement performed on the BFD reference signal set in the half-duplex mode; and
 detect whether the beam failure is due to self-interference based at least in part on a determination of whether a difference between the first beam measurement and the second beam measurement satisfies a threshold.

5. The UE of claim 4, wherein the first beam measurement is a first signal-to-interference-plus-noise ratio (SINR) measurement and the second beam measurement is a second SINR measurement.

6. The UE of claim 1, wherein the one or more processors are further configured to:
 transmit, to the base station and based at least in part on switching from the full-duplex mode to the half-duplex mode, a message including an indication that the UE has switched from the full-duplex mode to the half-duplex mode.

7. The UE of claim 6, wherein the message further includes an indication of whether to drop uplink communications or downlink communications from the slots configured for the full-duplex mode.

8. The UE of claim 6, wherein the one or more processors are further configured to:
receive, from the base station and based at least in part on transmitting the message, an indication of a new beam configured for the UE.

9. A user equipment (UE) for wireless communication, comprising:
a memory; and
one or more processors, coupled to the memory, configured to:
receive, from a base station, a first beam failure detection (BFD) reference signal set in one or more slots in a full-duplex mode, and a second BFD reference signal set in one or more slots in a half-duplex mode;
detect beam failure in the full-duplex mode based at least in part on the first BFD reference signal set;
detect a cause of the beam failure in the full-duplex mode based at least in part on measurements of the first BFD reference signal set in the full-duplex mode and measurements of the second BFD reference signal set in the half-duplex mode; and
transmit, to the base station in a beam failure recovery (BFR) medium access control (MAC) control element (MAC-CE), an indication of the cause of the beam failure.

10. The UE of claim 9, wherein the one or more processors are further configured to:
detect beam failure instances in the full-duplex mode based at least in part on the first BFD reference signal set; and
increment a first beam failure instance counter for each beam failure instance detected in the full-duplex mode, wherein detecting beam failure in the full-duplex mode is based at least in part on the first beam failure instance counter satisfying a first threshold within a first BFD timer duration.

11. The UE of claim 9, wherein the one or more processors are further configured to:
detect beam failure instances in the half-duplex mode based at least in part on the second BFD reference signal set;
increment a second beam failure instance counter for each beam failure instance detected in the half-duplex mode; and
detect beam failure in the half-duplex mode based at least in part on the second beam failure instance counter satisfying a second threshold within a second BFD timer duration.

12. The UE of claim 9, wherein the one or more processors, to detect the cause of the beam failure in the full-duplex mode, are configured to:
detect, based at least in part on the measurements of the first BFD reference signal set in the full-duplex mode and the measurements of the second BFD reference signal set in the half-duplex mode, that the cause of the beam failure in the full-duplex mode is one of a first cause associated with degraded link quality or a second cause associated with self-interference.

13. The UE of claim 12, wherein the indication is one of a first indication associated with the first cause or a second indication associated with the second cause, and wherein the indication is included in a bit field in the BFR MAC-CE.

14. The UE of claim 13, wherein the one or more processors are further configured to:
receive, from the base station and based at least in part on transmitting the first indication in the BFR MAC-CE, an indication of a new beam configured for the UE.

15. The UE of claim 13, wherein the one or more processors are further configured to:
receive, from the base station and based at least in part on transmitting the second indication in the BFR MAC-CE, an indication for the UE to switch from the full-duplex mode to the half-duplex mode for slots configured for the full-duplex mode.

16. The UE of claim 13, wherein the one or more processors are further configured to:
receive, from the base station and based at least in part on transmitting the second indication in the BFR MAC-CE, an indication of a new beam configured for the UE for communications with the base station in the full-duplex mode.

17. The UE of claim 13, wherein the one or more processors are further configured to:
switch, based at least in part on detecting that the cause of the beam failure in the full-duplex mode is the second cause, from the full-duplex mode to the half-duplex mode for slots configured for the full-duplex mode,
wherein transmitting the second indication in the BFR MAC-CE indicates, to the base station, that the UE is switching from the full-duplex mode to the half-duplex mode.

18. The UE of claim 9, wherein the first BFD reference signal set includes a first reference signal subset having a same frequency domain resource allocation as a frequency domain resource allocation of the second BFD reference signal set, and a second reference signal subset having a different frequency domain resource allocation as the frequency domain resource allocation of the second BFD reference signal set, and wherein the one or more processors are configured to detect the cause of the beam failure in the full-duplex mode is based at least in part on a comparison of a first beam measurement on the first reference signal subset of the first BFD reference signal set and a second beam measurement on the second BFD reference signal set.

19. The UE of claim 9, wherein the one or more processors are further configured to:
receive, from the base station, a first BFD resource configuration for the full-duplex mode and a second BFD resource configuration for the half-duplex mode, wherein the first BFD resource configuration indicates first BFD reference signal resources for the first BFD reference signal set, and the second BFD resource configuration indicates second BFD reference signal resources for the second BFD reference signal set.

20. The UE of claim 19, wherein the first BFD resource configuration indicates a first beam failure threshold, a first beam failure instance counter threshold, a first BFD timer duration associated, and first BFR resources for requesting BFR in the full-duplex mode, and the second BFD resource configuration indicates a second beam failure threshold, a second beam failure instance counter threshold, a second BFD timer duration, and second BFR resources for requesting BFR in the half-duplex mode.

21. A method of wireless communication performed by a user equipment (UE), comprising:
receiving, from a base station, a beam failure detection (BFD) reference signal set in one or more slots in a full-duplex mode and in one or more slots in a half-duplex mode;

detecting beam failure due to self-interference based at least in part on a comparison of measurements of the BFD reference signal set in the full-duplex mode and half-duplex mode; and switching from the full-duplex mode to the half-duplex mode for slots configured for the full-duplex mode based at least in part on detecting beam failure due to self-interference.

22. The method of claim 21, wherein detecting beam failure due to self-interference comprises:

comparing a first beam measurement performed on the BFD reference signal set in the full-duplex mode and a second beam measurement performed on the BFD reference signal set in the half-duplex mode; and detecting whether the beam failure is due to self-interference based at least in part on a determination of whether a difference between the first beam measurement and the second beam measurement satisfies a threshold.

23. The method of claim 22, wherein the first beam measurement is a first signal-to-interference-plus-noise ratio (SINR) measurement and the second beam measurement is a second SINR measurement.

24. The method of claim 21, further comprising:

transmitting, to the base station and based at least in part on switching from the full-duplex mode to the half-duplex mode, a message including an indication that the UE has switched from the full-duplex mode to the half-duplex mode.

25. A method of wireless communication performed by a user equipment (UE), comprising:

receiving, from a base station, a first beam failure detection (BFD) reference signal set in one or more slots in a full-duplex mode, and a second BFD reference signal set in one or more slots in a half-duplex mode;

detecting beam failure in the full-duplex mode based at least in part on the first BFD reference signal set;

detecting a cause of the beam failure in the full-duplex mode based at least in part on measurements of the first BFD reference signal set in the full-duplex mode and measurements of the second BFD reference signal set in the half-duplex mode; and transmitting, to the base station in a beam failure recovery (BFR) medium access control (MAC) control element (MAC-CE), an indication of the cause of the beam failure.

26. The method of claim 25, wherein detecting the cause of the beam failure in the full-duplex mode comprises:

detecting, based at least in part on the measurements of the first BFD reference signal set in the full-duplex mode and the measurements of the second BFD reference signal set in the half-duplex mode, that the cause of the beam failure in the full-duplex mode is one of a first cause associated with degraded link quality or a second cause associated with self-interference.

27. The method of claim 26, wherein the indication is one of a first indication associated with the first cause or a second indication associated with the second cause, and wherein the indication is included in a bit field in the BFR MAC-CE.

28. The method of claim 25, wherein the first BFD reference signal set includes a first reference signal subset having a same frequency domain resource allocation as a frequency domain resource allocation of the second BFD reference signal set, and a second reference signal subset having a different frequency domain resource allocation as the frequency domain resource allocation of the second BFD reference signal set, and wherein detecting the cause of the beam failure in the full-duplex mode is based at least in part on a comparison of a first beam measurement on the first reference signal subset of the first BFD reference signal set and a second beam measurement on the second BFD reference signal set.

29. The method of claim 25, further comprising:

receiving, from the base station, a first BFD resource configuration for the full-duplex mode and a second BFD resource configuration for the half-duplex mode, wherein the first BFD resource configuration indicates first BFD reference signal resources for the first BFD reference signal set, and the second BFD resource configuration indicates second BFD reference signal resources for the second BFD reference signal set.

30. The method of claim 29, wherein the first BFD resource configuration indicates a first beam failure threshold, a first beam failure instance counter threshold, a first BFD timer duration associated, and first BFR resources for requesting BFR in the full-duplex mode, and the second BFD resource configuration indicates a second beam failure threshold, a second beam failure instance counter threshold, a second BFD timer duration, and second BFR resources for requesting BFR in the half-duplex mode.

* * * * *